United States Patent
Kim

(10) Patent No.: US 11,049,443 B2
(45) Date of Patent: Jun. 29, 2021

(54) DISPLAY APPARATUS AND CONTROLLING METHOD THEREOF

(71) Applicant: SAMSUNG ELECTRONICS CO., LTD., Suwon-si (KR)

(72) Inventor: Young Kook Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/981,207

(22) PCT Filed: Jan. 25, 2019

(86) PCT No.: PCT/KR2019/001132
§ 371 (c)(1),
(2) Date: Sep. 15, 2020

(87) PCT Pub. No.: WO2019/177263
PCT Pub. Date: Sep. 19, 2019

(65) Prior Publication Data
US 2021/0134212 A1 May 6, 2021

(30) Foreign Application Priority Data
Mar. 16, 2018 (KR) .................. 10-2018-0030700

(51) Int. Cl.
*G09G 3/32* (2016.01)
*G09G 3/3208* (2016.01)
(Continued)

(52) U.S. Cl.
CPC ............. *G09G 3/32* (2013.01); *G06F 3/1446* (2013.01); *G09G 3/3208* (2013.01);
(Continued)

(58) Field of Classification Search
CPC .. G09G 3/32; G09G 3/3208; G09G 2300/026; G09G 2320/041; G06F 3/1446; G09F 9/3026
See application file for complete search history.

(56) References Cited

U.S. PATENT DOCUMENTS 4,035,644 A * 7/1977 Ciemochowski ...... G01N 25/68
250/340
9,081,361 B2 * 7/2015 Yokoi .................. G03G 21/203
(Continued)

FOREIGN PATENT DOCUMENTS

CN 106898294 A 6/2017
JP 2011-150034 A 8/2011
(Continued)

OTHER PUBLICATIONS

International Search Report dated May 17, 2019 (PCT/ISA/210) issued by the International Searching Authority in International Application No. PCT/KR2019/001132.
(Continued)

*Primary Examiner* — Michael J Jansen, II
(74) *Attorney, Agent, or Firm* — Sughrue Mion, PLLC

(57) ABSTRACT

A display apparatus includes a cabinet; a light emitting diode module provided in the cabinet; a communicator configured to receive an ambient atmospheric measurement value of the cabinet from an external device; a temperature sensor provided in the light emitting diode module; and a temperature controller configured to control a temperature of the light emitting diode module; and a controller configured to control the temperature controller so that the temperature of the light emitting diode module is greater than a dew point temperature when the measured temperature based on the output of the temperature sensor in a standby mode in a power saving state is equal to or lower than the dew point temperature based on the ambient atmospheric measurement
(Continued)

value, and drives the light emitting diode module so that the temperature of the light emitting diode module is greater than the dew point temperature when the measured temperature is below the dew point temperature based on the ambient atmospheric measurement value when switching to an active mode in a normal power supply state.

15 Claims, 14 Drawing Sheets

(51) Int. Cl.
  *G06F 3/14* (2006.01)
  *G06F 9/302* (2018.01)
  *G09F 9/302* (2006.01)
(52) U.S. Cl.
  CPC ..... *G09F 9/3026* (2013.01); *G09G 2300/026* (2013.01); *G09G 2320/041* (2013.01)

(56) References Cited

U.S. PATENT DOCUMENTS

| | | | | |
|---|---|---|---|---|
| 9,297,526 | B2* | 3/2016 | Kumano | F21V 29/50 |
| 9,808,375 | B2* | 11/2017 | Cornelius | G02B 27/0006 |
| 10,026,360 | B2* | 7/2018 | Jung | G09G 3/3266 |
| 10,175,926 | B1* | 1/2019 | Ezzahid | H04W 4/23 |
| 10,244,669 | B2* | 3/2019 | Lee | G02F 1/133308 |
| 10,252,558 | B2* | 4/2019 | Kohlmann | B41F 23/0409 |
| 10,772,243 | B2* | 9/2020 | Lee | G09F 23/06 |
| 10,827,657 | B2* | 11/2020 | Lee | G02F 1/133385 |
| 2005/0134525 | A1* | 6/2005 | Tanghe | G06F 3/1446 345/1.1 |
| 2012/0223877 | A1* | 9/2012 | Cho | G02F 1/133308 345/102 |
| 2013/0003382 | A1* | 1/2013 | Ohura | A01G 9/26 362/253 |
| 2014/0210928 | A1* | 7/2014 | Yokoi | G03G 15/04054 347/118 |
| 2014/0374402 | A1* | 12/2014 | Cornelius | A61F 9/028 219/211 |
| 2016/0133204 | A1* | 5/2016 | Kim | G09G 3/3614 345/101 |
| 2018/0049350 | A1* | 2/2018 | Lee | G09F 23/06 |
| 2018/0126766 | A1* | 5/2018 | Kohlmann | B41F 23/0453 |
| 2019/0208673 | A1* | 7/2019 | Lee | G09F 27/005 |
| 2019/0289756 | A1* | 9/2019 | Lee | G09F 15/005 |
| 2020/0150835 | A1* | 5/2020 | Park | G06F 3/0482 |
| 2020/0312231 | A1* | 10/2020 | Hussell | G09G 3/32 |
| 2020/0390009 | A1* | 12/2020 | Whitehead | H05K 7/20145 |
| 2021/0048969 | A1* | 2/2021 | Kim | G09G 3/2096 |
| 2021/0049954 | A1* | 2/2021 | Lee | G09G 3/342 |

FOREIGN PATENT DOCUMENTS

| | | |
|---|---|---|
| JP | 5261612 B2 | 8/2013 |
| KR | 10-2013-0137021 A | 12/2013 |
| KR | 10-1336970 B1 | 12/2013 |
| KR | 10-2015-0068519 A | 6/2015 |

OTHER PUBLICATIONS

Communication dated Feb. 10, 2021 issued by the European Patent Office in European Application No. 19767788.3.

* cited by examiner

DISPLAY APPARATUS AND CONTROLLING METHOD THEREOF

TECHNICAL FIELD

Embodiments of the disclosure relate to a display apparatus and a controlling method thereof, and more specifically to a display apparatus for preventing condensation of water vapor that has penetrated the display apparatus in a high-humidity environment.

BACKGROUND ART

In general, a display apparatus is an output device that visually displays received or stored image information to a user, and is used in various home-based or business fields.

For example, the display apparatus is a monitor device connected to a personal computer or a server computer; portable computer devices such as navigation terminal devices, general television devices, Internet Protocol television (IPTV) devices, smartphones, tablet PCs, and personal digital assistants (PDAs); portable terminal devices such as a cellular phone; various display devices used to reproduce images such as advertisements and movies in industrial sites; or other various types of audio/video systems Such display apparatus may display an image using various types of display panels. For example, the display apparatus may include a light emitting diode (LED) panel, an organic light emitting diode (OLED) panel, a liquid crystal display (LCD) panel, and the like.

When such display apparatus is placed in a high-temperature and high-humidity environment, water vapor may penetrate the display apparatus. In addition, water vapor that has penetrated the display apparatus may condense inside the display apparatus, thereby deteriorating the display apparatus.

DISCLOSURE

Technical Problem

One aspect provides a display apparatus and a controlling method thereof for preventing condensation of water vapor that has penetrated the display apparatus in a high-temperature and high-humidity environment.

One aspect provides a display apparatus and a control method thereof for preventing deterioration of water vapor that has penetrated the display apparatus in a high-temperature and high-humidity environment.

Technical Solution

In accordance with an aspect of the disclosure, a display apparatus includes a cabinet; a light emitting diode module provided in the cabinet; a communicator configured to receive an ambient atmospheric measurement value of the cabinet from an external device; a temperature sensor provided in the light emitting diode module; a temperature controller configured to control a temperature of the light emitting diode module; and a controller configured to control the temperature controller so that the temperature of the light emitting diode module is greater than a dew point temperature when the measured temperature based on an output of the temperature sensor in a standby mode being a power saving state is equal to or lower than the dew point temperature based on the ambient atmospheric measurement value, and drives the light emitting diode module so that the temperature of the light emitting diode module is greater than the dew point temperature when the measured temperature is below the dew point temperature based on the ambient atmospheric measurement value when switching to an active mode being a normal power supply state.

The controller may transmit a control signal through the communicator so that the external device controls an ambient atmospheric environment based on the control signal when the measured temperature is less than the dew point temperature during the standby mode, and transmit the control signal to stop the operation of the external device through the communicator when the measured temperature is greater than the dew point temperature.

The controller may drive at least one red light emitting diode element included in the light emitting diode module when switching to the active mode, and control the light emitting diode module to display an image when the measured temperature is equal to or greater than the dew point temperature.

The light emitting diode module may include a plurality of light emitting diode elements, and a printed circuit board on which the plurality of light emitting diode elements are mounted, and the temperature controller may include a heater provided on the printed circuit board, and drives the heater when the measured temperature is above the dew point temperature during the standby mode.

The temperature controller may include a fan circulating air inside the cabinet, and drives the fan when the measured temperature is above the dew point temperature during the standby mode.

An ambient atmospheric environment may include an ambient temperature and an ambient humidity of the cabinet.

The external device may include a sensor module configured to sense the ambient temperature and the ambient humidity of the cabinet, and the controller may calculate the dew point temperature based on an output of the sensor module received through the communicator.

An ambient atmospheric environment may include an ambient temperature and an ambient humidity of the cabinet, and the display apparatus may further include a sensor module configured to detect the ambient temperature and the ambient humidity of the cabinet, and the controller may calculate the dew point temperature based on an output of the sensor module.

The display apparatus may further include a storage configured to store data including the dew point temperature and the data and time at which the dew point temperature was calculated, and the controller acquires the dew point temperature based on the data stored in the storage.

In accordance with an aspect of the disclosure, a controlling method of a display apparatus including a light emitting diode module, a temperature sensor provided in the light emitting diode module, and a temperature controller controlling a temperature of the light emitting diode module, the method may include calculating a dew point temperature; controlling the temperature controller so that the temperature of the light emitting diode module is greater than the dew point temperature when the measured temperature based on an output of the temperature sensor in a standby mode being a power saving state is equal to or lower than the dew point temperature based on an ambient atmospheric measurement value, and driving the light emitting diode module so that the temperature of the light emitting diode module is greater than the dew point temperature when the measured temperature is below the dew point temperature based on the ambient atmospheric measurement value when switching to an active mode being a normal power supply state.

The method may further include transmitting a control signal through the communicator so that an external device controls an ambient atmospheric environment based on the control signal when the measured temperature is less than the dew point temperature during the standby mode, and transmitting the control signal to stop the operation of the external device through the communicator when the measured temperature is greater than the dew point temperature.

The method may further include driving at least one red light emitting diode element included in the light emitting diode module when switching to the active mode, and controlling the light emitting diode module to display an image when the measured temperature is equal to or greater than the dew point temperature.

The method may further include driving a fan provided on a printed circuit board of the light emitting diode module when the measured temperature is above the dew point temperature during the standby mode.

The method may further include driving a fan circulating air inside a cabinet when the measured temperature is above the dew point temperature during the standby mode.

An ambient atmospheric environment may include an ambient temperature and an ambient humidity of the display apparatus, and circulating the dew point temperature may include calculating the dew point temperature based on the received ambient temperature and the ambient humidity of the display apparatus.

An ambient atmospheric environment may include an ambient temperature and an ambient humidity of the display apparatus, and calculating the dew point temperature includes calculating the dew point temperature based on an output of a sensor module calculating the ambient temperature and the ambient humidity of the display apparatus.

The method further include storing data including the dew point temperature and the data and time at which the dew point temperature was calculated, and the calculating the dew point temperature includes acquiring the dew point temperature based on the stored data.

In accordance with an aspect of the disclosure, a display apparatus includes a cabinet; a light emitting diode module provided in the cabinet; a temperature sensor provided in the light emitting diode module; and a processor configured to selectively drive a red light emitting diode element included in the light emitting diode module when a dew point temperature of ambient air in the cabinet is greater than a temperature of the light emitting diode module based on an output of the temperature sensor.

The display apparatus may further include a sensor module provided inside or outside of the cabinet. The processor may calculate a dew point temperature from an ambient temperature and an ambient humidity based on an output of the sensor module.

The display apparatus may further include a communicator communicating data with an external device. The processor may calculate the dew point temperature from the received ambient temperature and the ambient humidity received from the external device through the communicator.

The display apparatus may further include storage data including the dew point temperature and the data and time at which the dew point temperature was calculated, and the controller acquires the dew point temperature based on the data stored in the storage.

Advantageous Effects

According to one aspect of the disclosed invention, it is possible to provide a display apparatus and a control method for preventing water vapor from condensing on the basis of the obtained environmental information.

According to one aspect of the disclosed invention, it is possible to provide a display apparatus and a control method for preventing deterioration due to condensation of water vapor that has penetrated the display apparatus.

According to one aspect of the disclosed invention, it is possible to provide a display apparatus and a control method for obtaining environmental information from an external device.

According to one aspect of the disclosed invention, to prevent condensation of water vapor, it is possible to provide a display apparatus capable of controlling an external device and a control method thereof.

According to one aspect of the disclosed invention, it is possible to provide a display apparatus and a control method for preventing water vapor from condensing on the basis of environmental information stored in advance.

MODE FOR INVENTION

Figure 1:
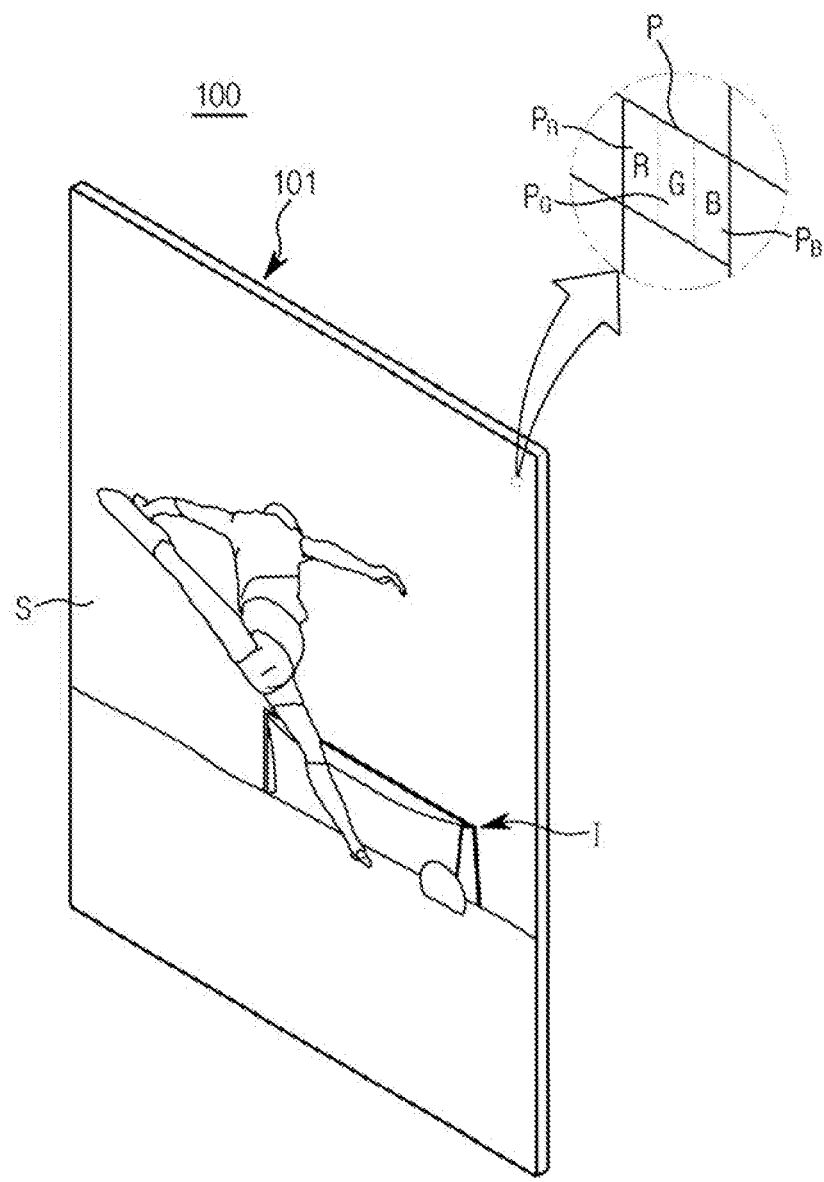
FIG. 1 shows an appearance of a display apparatus according to an embodiment.
Figure 1:
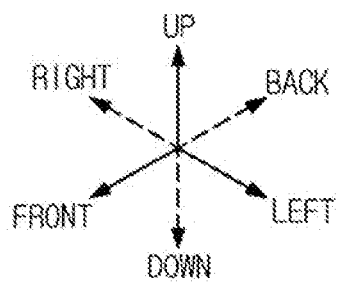

In the following description, like reference numerals refer to like elements throughout the specification. This specification does not describe all elements of the embodiments, and in the technical field to which the present invention pertains, there is no overlap between the general contents or the embodiments. Terms such as "unit," "module," "member," and "block" may be embodied as hardware or software.

According to embodiments, a plurality of "units," "modules," "members," or "blocks" may be implemented as a single component or a single "unit," "module," "member," or "block" may include a plurality of components.

In all specifications, it will be understood that when an element is referred to as being "connected" to another element, it can be directly or indirectly connected to the other element, wherein the indirect connection includes "connection via a wireless communication network."

Also, when a part "includes" or "comprises" an element, unless there is a particular description contrary thereto, the part may further include other elements, not excluding the other elements.

Throughout the specification, when one member is positioned "on" another member, this includes not only the case where one member abuts another member, but also the case where another member exists between the two members.

The terms first, second, etc. are used to distinguish one component from another component, and the component is not limited by the terms described above.

An expression used in the singular form encompasses the expression of the plural form, unless it has a clearly different meaning in the context.

The reference numerals used in operations are used for descriptive convenience and are not intended to describe the order of operations and the operations may be performed in an order different unless otherwise stated.

Hereinafter, embodiments of the present disclosure will be described with reference to the accompanying drawings.

FIG. 1 shows an appearance of a display apparatus according to an embodiment.

A display apparatus 100 is a device capable of processing an image signal received from the outside and visually displaying the processed image. The display apparatus 100 is not limited by use, type, shape, and the like. For example, the display apparatus 100 may be implemented in various forms such as a television (TV), a monitor, a kiosk, a portable multimedia device, a portable communication device, and a portable computing device. If the display apparatus 100 is a device that visually displays an image, its form is not limited.

In addition, the display apparatus 100 may be a large display apparatus (Large Format Display, LFD) installed outdoors, such as on a roof of a building or at a bus stop. Here, the outdoors is not necessarily limited to the outdoors, and the display apparatus 100 according to an embodiment may be installed in a subway station, a shopping mall, a movie theater, a company, a shop, etc., wherever a large number of people can enter or exit.

The display apparatus 100 may receive a video signal and an audio signal from various content sources, and output video and audio corresponding to the video signal and the audio signal. For example, the display apparatus 100 may receive television broadcast content through a broadcast reception antenna or a wired cable, receive content from a content play back device, or receive content from a content providing server on a network.

As shown in FIG. 1, the display apparatus 100 includes a cabinet 101 for receiving a plurality of parts for displaying an image I and a screen S provided on one side of the cabinet 101 to display the image I.

The cabinet 101 forms an outer shape of the display apparatus 100, and inside the cabinet 101, a component for the display apparatus 100 to display the image I may be provided. The cabinet 101 shown in FIG. 1 is a flat plate shape, but the shape of the cabinet 101 is not limited to that shown in FIG. 1. For example, the cabinet 101 may have a shape in which both right and left ends protrude forward and a center portion is concave.

The screen S is formed on the front of the cabinet 101, and the image I, which is visual information, may be displayed on the screen. For example, a still image or a video may be displayed on the screen S, and a 2D flat image or a 3D stereoscopic image may be displayed.

A plurality of pixels P are formed on the screen S, and the image I displayed on the screen S may be formed by a combination of light emitted from the plurality of pixels P. For example, one of the images I may be formed on the screen S by combining light emitted from the plurality of pixels P as a mosaic.

Each of the plurality of pixels P may emit light of various brightness and various colors. In order to emit light of various brightness, each of the plurality of pixels P includes, for example, a configuration capable of directly emitting light (e.g., an organic light emitting diode) or light emitted by a backlight unit or the like (e.g., a liquid crystal panel) that can transmit or block.

In order to emit light of various colors, each of the plurality of pixels P may include sub-pixels $P_R$, $P_G$, and $P_B$.

The sub-pixels $P_R$, $P_G$, and $P_B$ include the red sub-pixel $P_R$ that can emit red light, the green sub-pixel $P_G$ that can emit green light, and the blue sub-pixel $P_B$ that can emit blue light. For example, the red sub-pixel $P_R$ may emit red light having a wavelength of approximately 620 nm (nanometer, 1 billionth of a meter) to 750 nm, the green sub-pixel $P_G$ can emit green light having a wavelength of approximately 495 nm to 570 nm, and the blue sub-pixel $P_B$ may emit blue light having a wavelength of approximately 450 nm to 495 nm.

By the combination of the red light of the red sub-pixel $P_R$, the green light of the green sub-pixel $P_G$ and the blue light of the blue sub-pixel $P_B$, each of the plurality of pixels P may emit light of various brightness and various colors.

The screen S shown in FIG. 1 is a flat plate shape, but the shape of the screen S is not limited to that shown in FIG. 1. For example, depending on the shape of the cabinet 101, the screen S may have a shape in which both right and left ends protrude forward and the center portion is concave.

The display apparatus 100 may include various types of display panels for displaying an image. For example, the display apparatus 100 may include a self-luminous display that displays an image using a device that emits light by itself. The self-luminous display includes a light emitting diode module (LED module) or an organic light emitting diode panel (OLED panel). In addition, the display apparatus 100 may include a non-light emitting display that displays an image by passing or blocking light emitted from a light source (backlight unit). Non-luminescent displays include liquid crystal display panels (LCD panels).

Hereinafter, the display apparatus 100 including a light emitting diode module is described.

Figure 2:
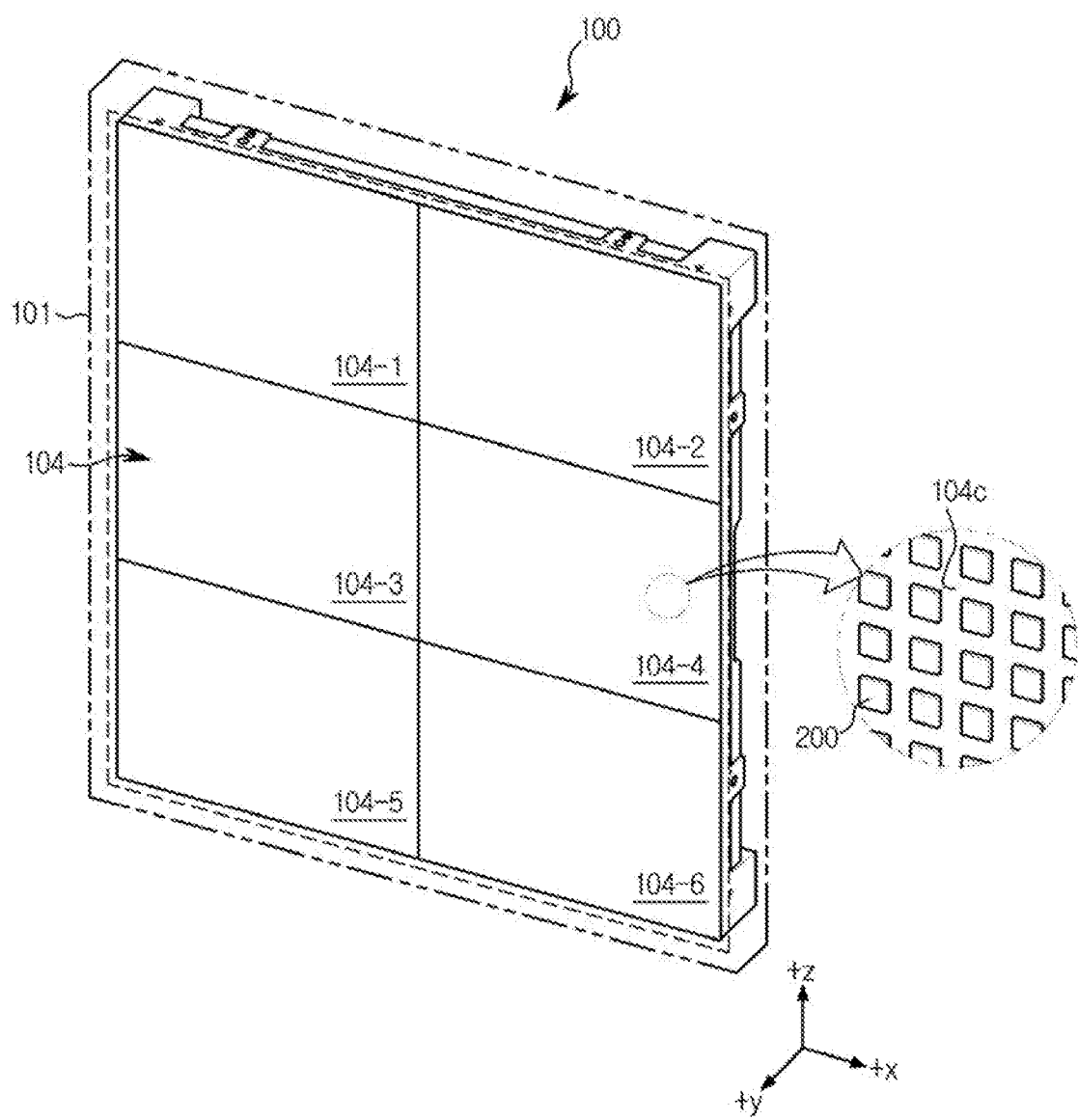
FIG. 2 shows an example of the front of a display apparatus according to an embodiment.
Figure 3:
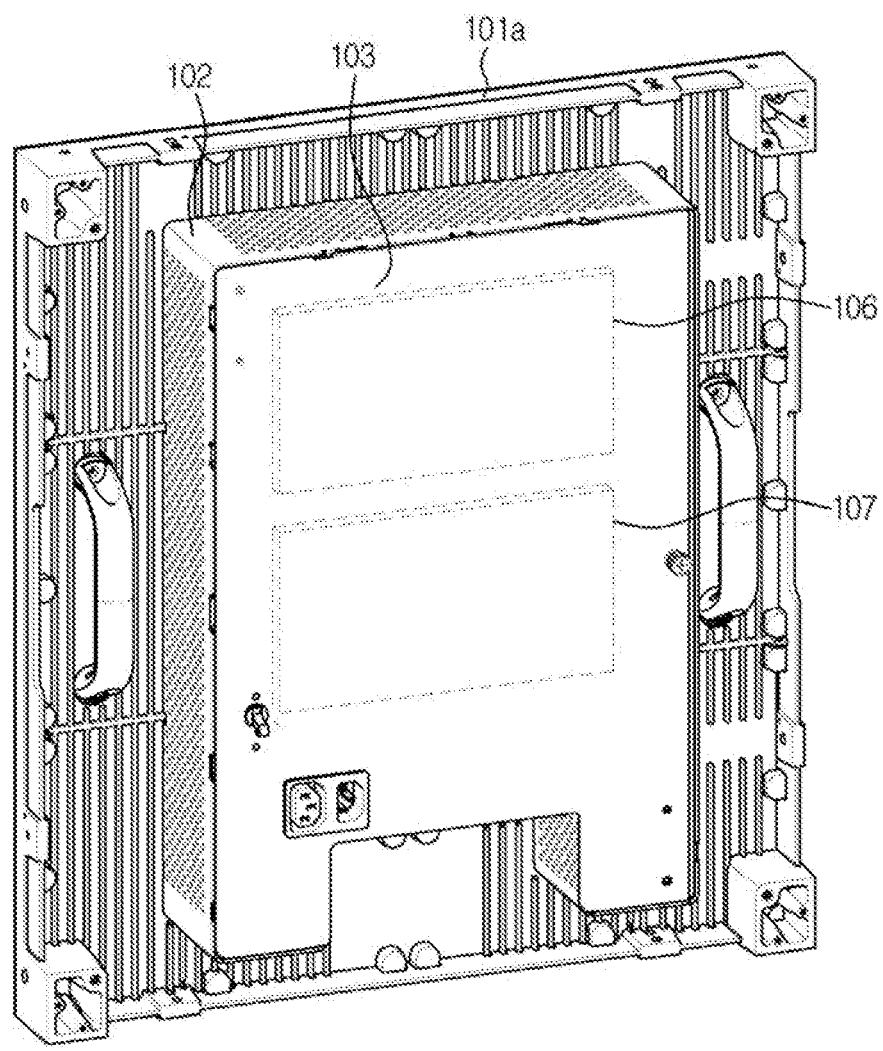
FIG. 3 shows an example of the back of a display apparatus according to an embodiment.
Figure 4:
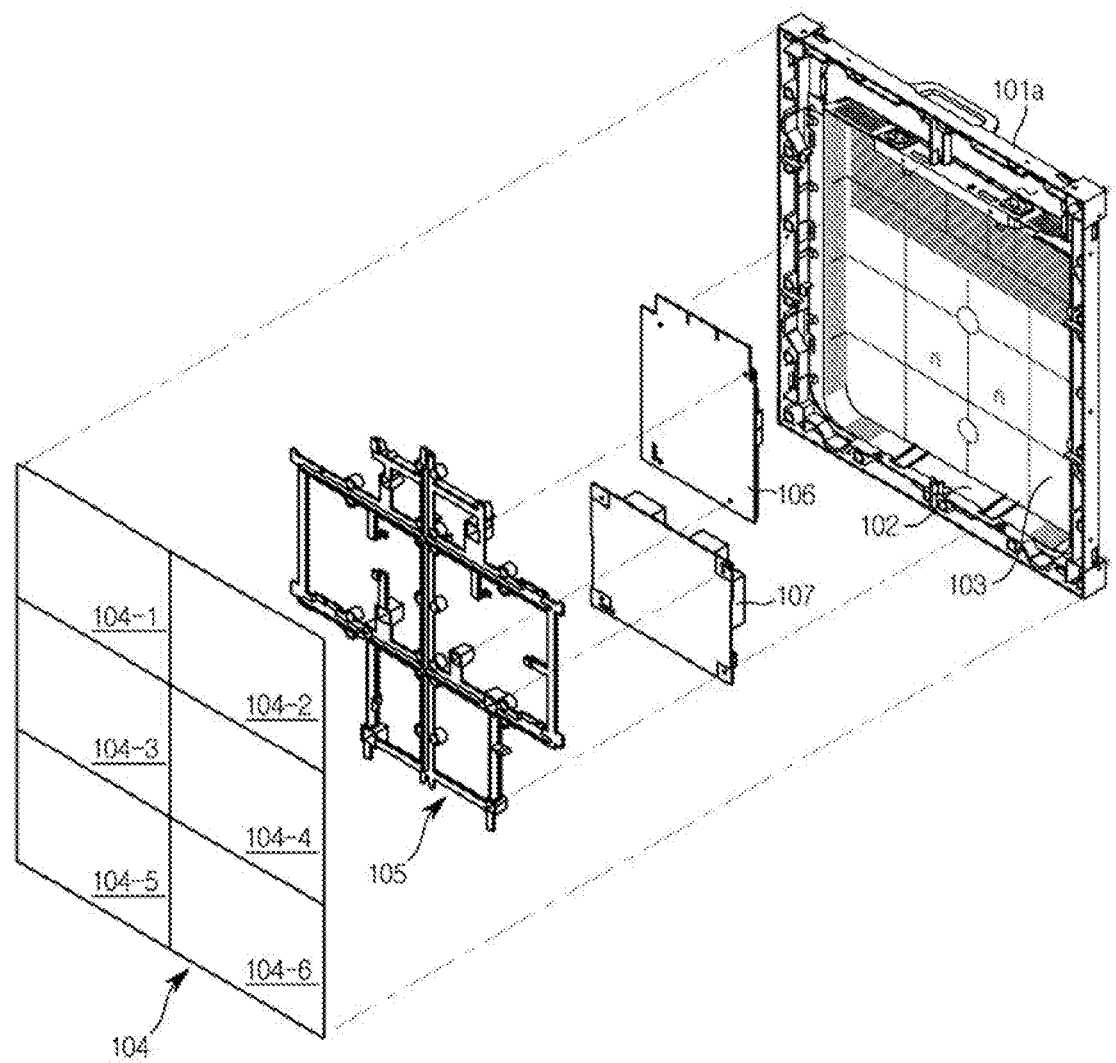
FIG. 4 shows an example of an exploded view of a display apparatus according to an embodiment.

FIG. 2 shows an example of the front of a display apparatus according to an embodiment. FIG. 3 shows an example of the back of a display apparatus according to an embodiment. FIG. 4 shows an example of an exploded view of a display apparatus according to an embodiment.

As shown in FIGS. 2, 3, and 4, various component parts for displaying the image I on the screen S may be provided inside the cabinet 101.

The display apparatus 100 includes a light emitting diode module 104 that emits light toward the front to generate an image, a control assembly 106 mounted with a configuration for controlling the operation of the light emitting diode module 104, a power supply assembly 107 mounted with a configuration for supplying power to the light emitting diode module 104 and the control assembly 106, and a chassis 105 that supports/fixes the control assembly 106 and the power assembly 107.

Light emitting diode modules 104-1, 104-2, 104-3, 104-4, 104-5, and 104-6 may be provided on the front surface of the display apparatus 100. FIGS. 2, 3, and 4 have the display apparatus 100 composed of the light emitting diode modules 104-1, 104-2, 104-3, 104-4, 104-5, and 104-6 arranged in 2×3. But, it is not limited thereof, and the number and arrangement of light emitting diode modules may be variously modified.

The light emitting diode modules 104-1, 104-2, 104-3, 104-4, 104-5, and 104-6: 104 may include a plurality of light emitting diode elements 200 placed on a module substrate 104c. The plurality of light emitting diode devices 200 may be arranged in a matrix form. In addition, each of the plurality of light emitting diode devices 200 may include a light emitting diode. A light emitting diode represents a semiconductor device that emits light of a predetermined wavelength when power is supplied. The light emitting diode has a polarity like a general diode, and when a voltage is applied between a cathode and an anode, a current passing through the light emitting diode flows and emits light.

Each of the plurality of light emitting diode devices 200 may emit light of various colors and various brightness. The light emitting diodes included in each of the plurality of light emitting diode devices 200 may emit light having different wavelengths (different colors) according to a constituent material. For example, light emitting diodes including aluminum gallium arsenide (AlGaAs), gallium arsenide phosphorus (GaAsP), and gallium phosphide (GaP) may emit red light from approximately 620 nm to 750 nm, light emitting diodes containing indium gallium nitride (InGaN) may emit green light with a wavelength of approximately 495 nm to 570 nm, and light emitting diodes including gallium nitride (GaN) may emit blue light having a wavelength of approximately 450 nm to 495 nm.

The plurality of light emitting diode devices 200 includes a red light emitting diode device that implements the red sub-pixel $P_R$, a green light emitting diode device that implements the green sub-pixel $P_G$, and the blue sub-pixel $P_B$. The red light emitting diode device, the green light emitting diode device, and the blue light emitting diode device may integrally implement one of the pixels P and may be repeatedly arranged.

In addition, the plurality of light emitting diode elements 200 may emit light of different intensities according to a magnitude of the supplied current. The light emitting diodes included in each of the plurality of light emitting diode devices 200 may emit light having a strong intensity as a driving current supplied increases.

An image may be formed by a combination of light emitted from each of the plurality of light emitting diode elements 200. For example, by the combination of the red light emitted from a red light emitting diode, the green light emitted from a green light emitting diode, and the blue light emitted from the blue light emitting diode, an image may be formed.

The light emitting diode module 104 may form the screen S of the display apparatus 100 described above, and each of the plurality of light emitting diode elements 200 may form the pixels P or the sub-pixels $P_R$, $P_G$, and $P_B$ described above.

The screen S includes a set of one of the light emitting diode modules 104 or the plurality of light emitting diode modules 104-1, 104-2, 104-3, 104-4, 104-5, and 104-6, and the plurality of light emitting diode modules 104-1, 104-2, 104-3, 104-4, 104-5, and 104-6 may be arranged in the form of an M*N matrix.

The control assembly 106 can include a control circuit that controls the operation of the light emitting diode module 104. The control circuit processes image data received from an external content source, and may transmit the image data to the light emitting diode module 104 so that the plurality of light emitting diode elements 200 emit light having different colors and different brightness.

The power supply assembly 107 may supply power to the light emitting diode module 104 so that the plurality of light emitting diode devices 200 emit light having different colors and different brightness.

The control assembly 106 and the power supply assembly 107 may be implemented with a printed circuit board and various circuits mounted on the printed circuit board. For example, a power supply circuit may include a capacitor, a coil, a resistance element, a microprocessor, and the like, and a power supply circuit board on which they are mounted. Further, the control circuit may include a memory, a microprocessor, and a control circuit board on which they are mounted.

The cabinet 101 may include a front bracket 101a, a frame bracket 102 and a rear cover 103, and the front bracket 101a, the frame bracket 102, and the rear cover 103 may support and accommodate the internal light emitting diode module 104, the control assembly 106, and the power assembly 107.

The front bracket 101a may support the light emitting diode module 104. The frame bracket 102 is located on the rear surface of the front bracket 101a and can accommodate the control assembly 106 and the power assembly 107. The rear cover 103 may open and close the rear surface of the frame bracket 102.

The chassis 105 may support the control assembly 106 and the power assembly 107. For example, the control assembly 106 and the power assembly 107 can be fixed to the chassis 105 and the chassis 105 can be fixed to the cabinet 101.

Figure 5:
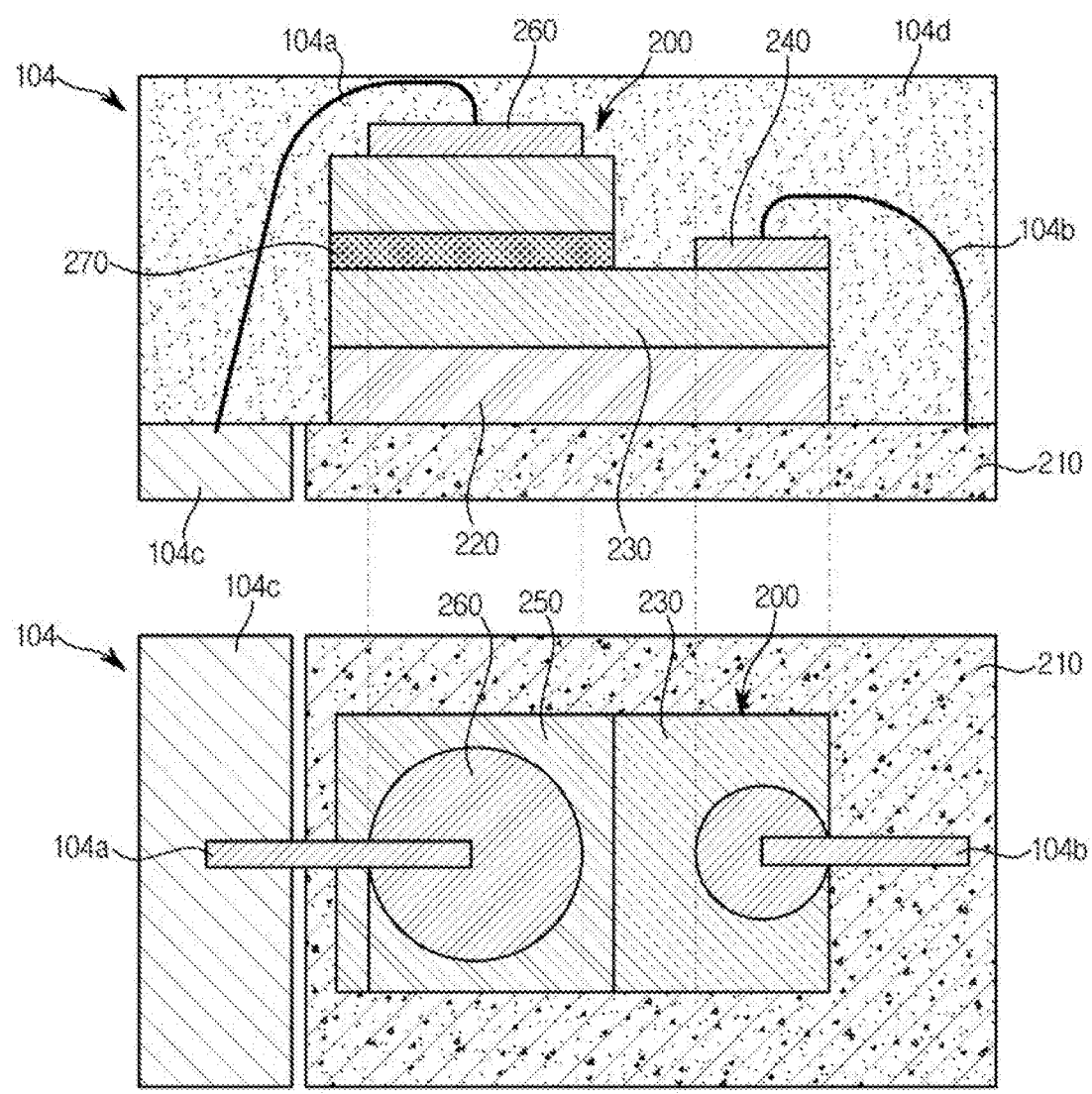
FIG. 5 shows an example of a light emitting diode device included in a display apparatus according to an embodiment.

FIG. 5 shows an example of a light emitting diode device included in a display apparatus according to an embodiment.

As shown in FIG. 5, the light emitting diode device 200 includes an LED package substrate 210, a sapphire substrate 220, an n-type semiconductor layer 230, an n-type pad 240, a p-type semiconductor layer 250, and a p-type pad 260.

The light emitting diode device 200 may be manufactured by growing the n-type semiconductor layer 230 on the sapphire substrate 220 and then growing the p-type semiconductor layer 250.

The sapphire substrate 220 functions as a base for growing the n-type semiconductor layer 230 and the p-type semiconductor layer 250. After aluminum (Al2O3) is melted at a high temperature and gradually cooled, the single crystal sapphire substrate 220 may be manufactured.

The n-type semiconductor layer 230 refers to a semiconductor through which free electrons transfer charge (electricity). The n-type semiconductor layer 230 may be manufactured by adding a donor material to a basic material (e.g., Si, GaAs, GaN, etc.) forming a semiconductor. Specifically, since the semiconductor base material and the donor material are injected together in a chamber where the sapphire substrate 220 is placed, the n-type semiconductor layer 230 may be grown on the sapphire substrate 220.

The p-type semiconductor layer 250 refers to a semiconductor through which holes transfer charge (electricity). The p-type semiconductor layer 250 may be manufactured by adding an acceptor material to a basic material forming a semiconductor (e.g., Si, GaAs, GaN, etc.). Specifically, the p-type semiconductor layer 250 is formed on the n-type semiconductor layer 230 because the semiconductor base material and the acceptor material are injected together in the chamber where the sapphire substrate 220 on which the n-type semiconductor layer 230 is formed is placed.

A depletion region 270 is formed at a boundary between the n-type semiconductor layer 230 and the p-type semiconductor layer 250, and light is formed by a combination of free electrons and holes in the depletion layer 270. The frequency of light (color of light) generated in the depletion layer 270 depends on an energy band gap of the semiconductor material, and the intensity of light may depend on the current supplied to the light emitting diode device 200.

The n-type pad 240 may connect the n-type semiconductor layer 230 and wires 104a and 104b described below. The n-type pad 240 is injected with a high concentration of donor material, and accordingly, the n-type pad 240 has high electrical conductivity and has very low electrical resistance when contacted with the wires 104a and 104b. The n-type pad 240 may be formed by implanting a donor material into the n-type semiconductor layer 230 using ion implantation or by growing a semiconductor layer with a high concentration of donor material. The n-type pad 240 corresponds to a cathode terminal of the light emitting diode device 200.

The p-type pad 260 may connect the n-type semiconductor layer 230 and the wires 104a and 104b described below. The n-type pad 240 is injected with a high concentration of donor material, and accordingly, the n-type pad 240 has high electrical conductivity and has very low electrical resistance when contacted with the wires 104a and 104b. The n-type pad 240 may be formed by implanting a donor material into the n-type semiconductor layer 230 using ion implantation or by growing a semiconductor layer with a high concentration of donor material. The p-type pad 260 corresponds to an anode terminal of the light emitting diode device 200.

A light emitting diode chip is manufactured in this manner, and the light emitting diode chip is placed on the LED package substrate 210 to produce the light emitting diode device (light emitting diode package) 200.

Then, the light emitting diode device 200 is placed on the module substrate 104c forming the light emitting diode module 104, and the light emitting diode device 200 and the module substrate 104c may be electrically connected by the wires 104a and 104b.

The wires 104a and 104b may include the positive wire 104a connecting the p-type pad 260 (anode of the light emitting diode element) and the module substrate 104c, and the negative wire 104b connecting the n-type pad 240 (anode of the light emitting diode element) and the module substrate 104c.

The wires 104a and 104b may be composed of gold (Au) or the like having high electrical conductivity to minimize the loss of a signal.

In this way, the light emitting diode device 200 is mounted on the module substrate 104c so that the light emitting diode module 104 can be manufactured.

In addition, epoxy resin 104d may be coated on the front surface (surface on which the light emitting diode device is installed) of the light emitting diode module 104 to protect the light emitting diode device 200.

As such, the light emitting diode device 200 included in the light emitting diode module 104 may be protected by the epoxy resin 104d.

However, even if the epoxy resin 104d is coated, water vapor can penetrate the epoxy resin 104d to penetrate the light emitting diode device 200. For example, when the light emitting diode module 104 is placed in a high-temperature and high-humidity environment, water vapor may penetrate the epoxy resin 104d to penetrate the light emitting diode device 200.

The water vapor that has penetrated to the light emitting diode device 200 condenses when the light emitting diode device 200 is cooled, and thus water droplets may be formed in the light emitting diode device 200.

As such, ionization of the wires 104a and 104b may occur by water droplets (moisture) generated by condensation of water vapor. In other words, the wires 104a and 104b contacting the p-type pad 260 may be extended to the n-type semiconductor layer 230 by ionization. As a result, an electrical short circuit between the p-type semiconductor layer 250 and the n-type semiconductor layer 230 occurs, and the light emitting diode device 200 and the light emitting diode module 104 may be damaged.

To prevent this, the display apparatus 100 may include a configuration for adjusting a temperature of the light emitting diode device 200 according to an ambient temperature and an ambient humidity, or a configuration for controlling the ambient temperature and the ambient humidity.

Hereinafter, the configuration of the display apparatus 100 will be described.

Figure 6:
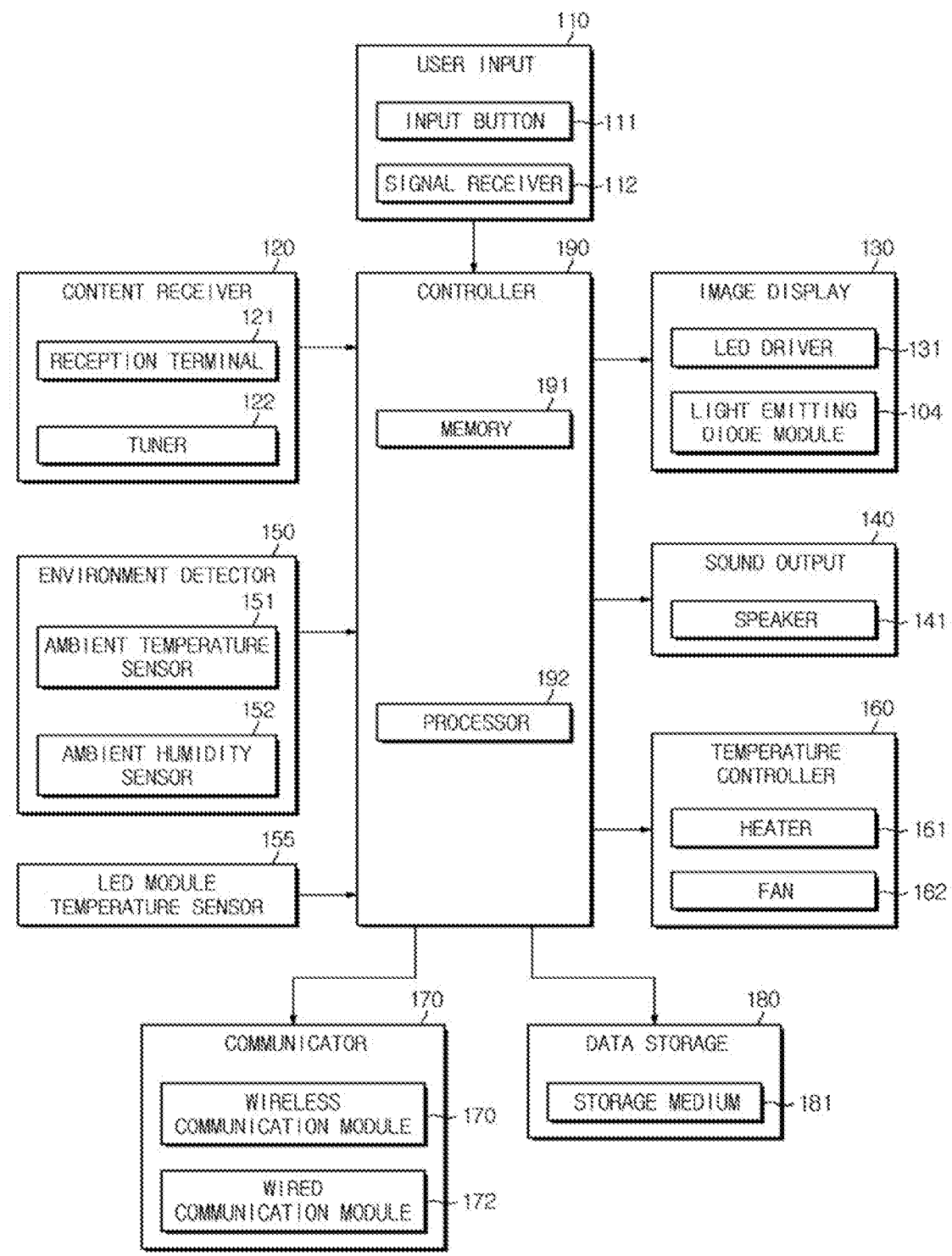
FIG. 6 shows a configuration of a display apparatus according to an embodiment.
Figure 7:
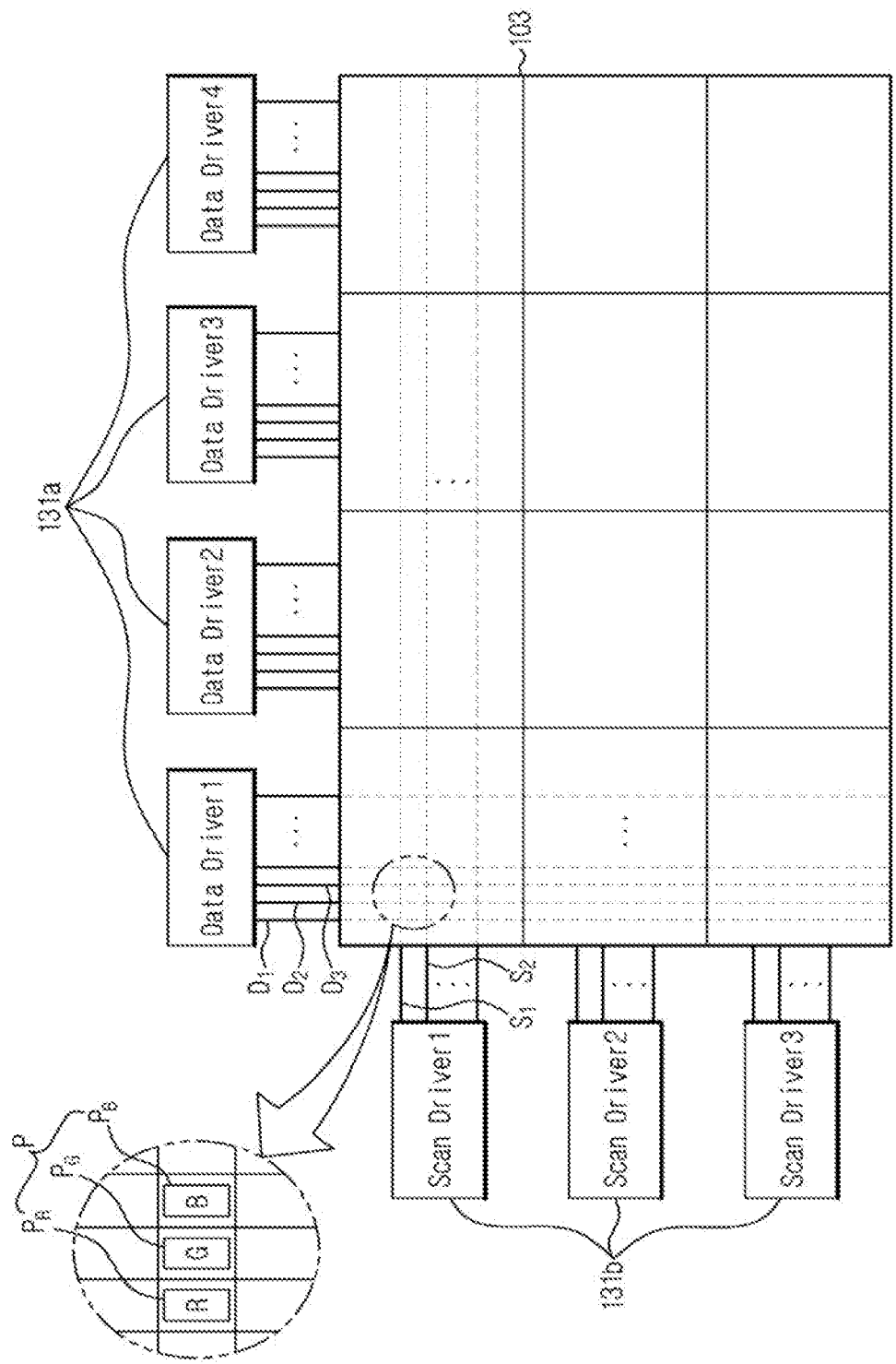
FIGS. 7 and 8 show an example of a light emitting diode module included in a display apparatus according to an embodiment.
Figure 8:
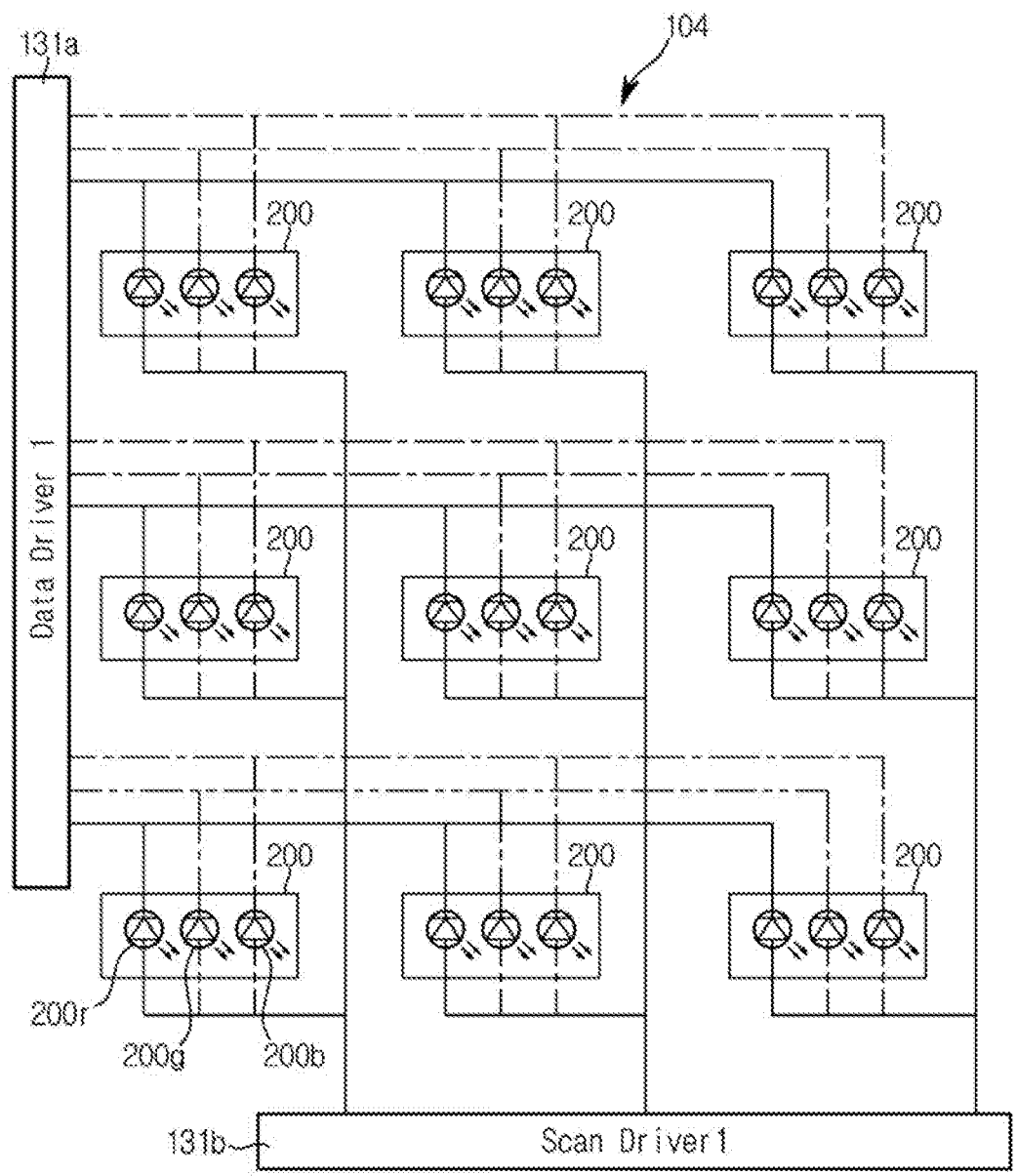
Figure 9:
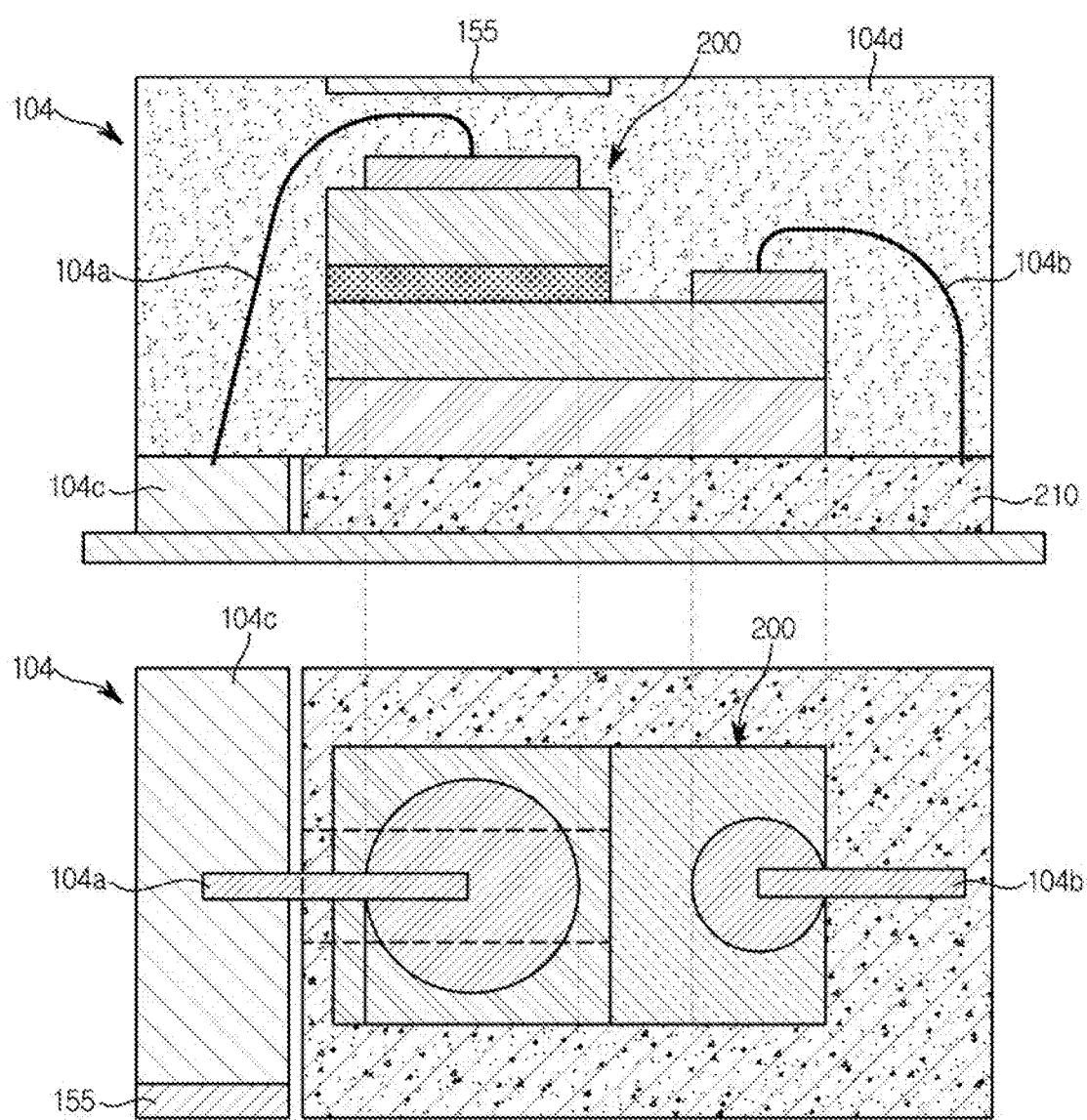
FIG. 9 shows an example of a light emitting diode device and an LED module temperature sensor included in a display apparatus according to an embodiment.
Figure 10:
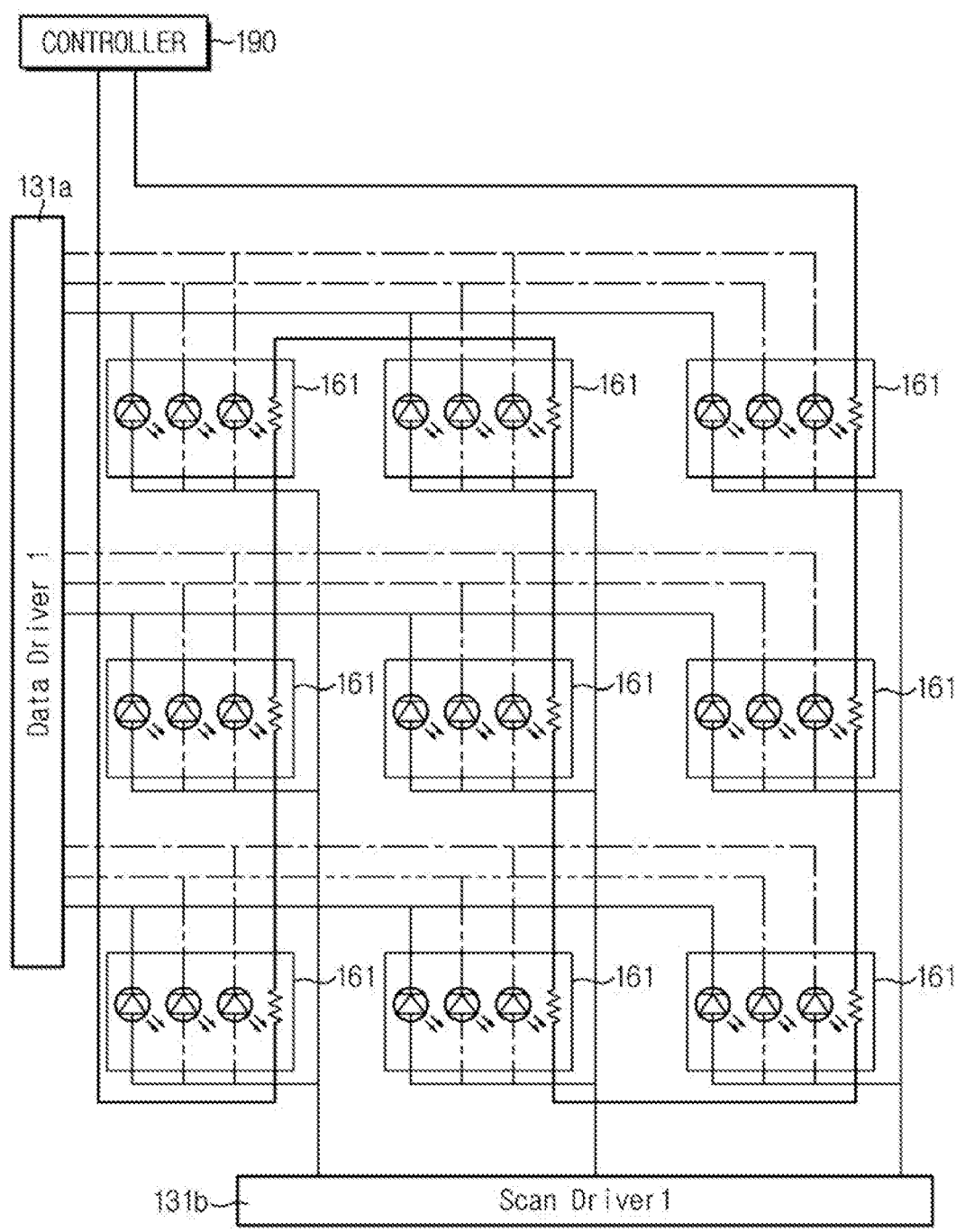
FIG. 10 shows an example of a light emitting diode module and an LED heater included in a display apparatus according to an embodiment.
Figure 11:
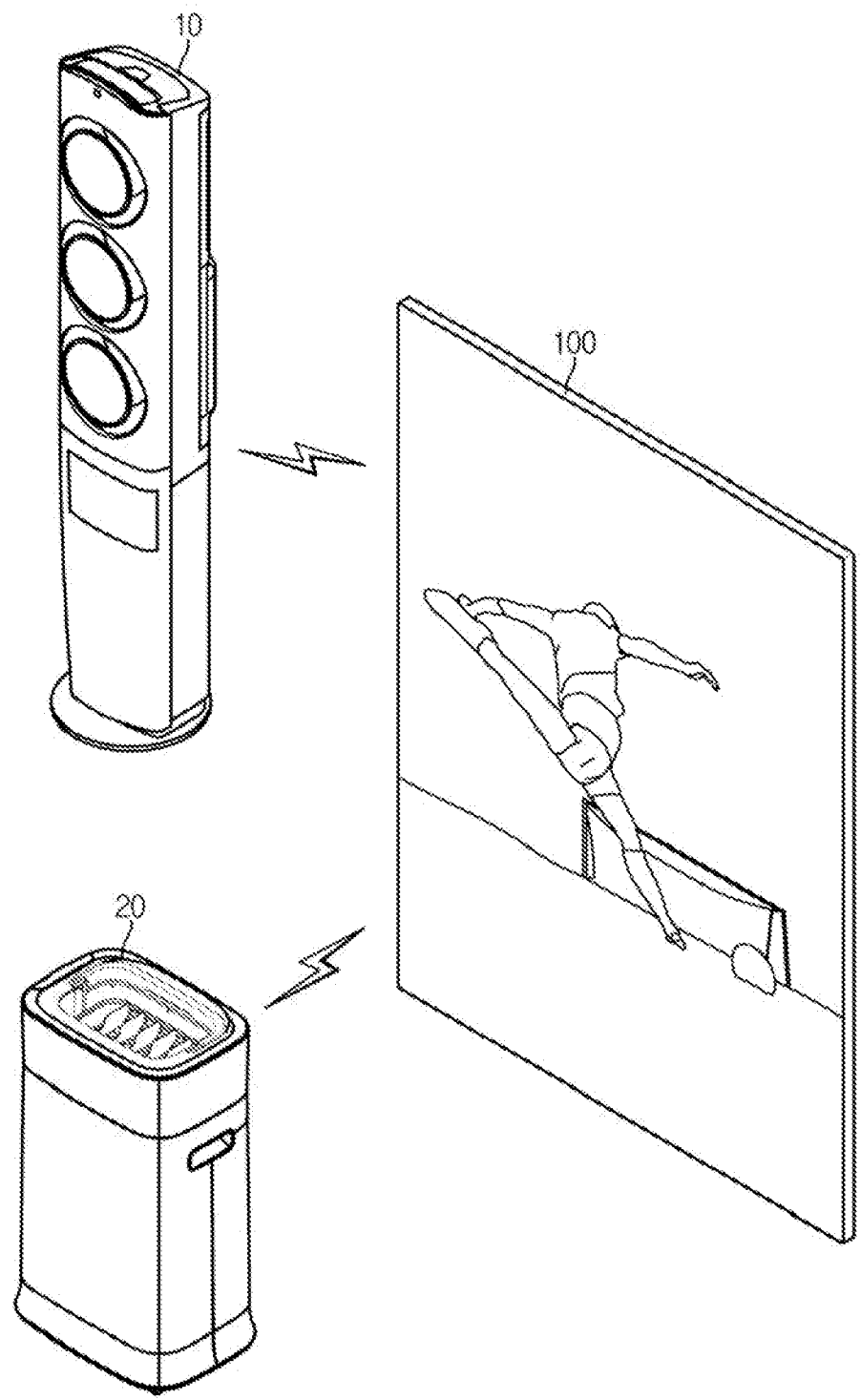
FIG. 11 shows an example in which a display apparatus according to an embodiment communicates with an external device.

FIG. 6 shows a configuration of a display apparatus according to an embodiment. FIGS. 7 and 8 show an example of a light emitting diode module included in a display apparatus according to an embodiment. FIG. 9 shows an example of a light emitting diode device and an LED module temperature sensor included in a display apparatus according to an embodiment. FIG. 10 shows an example of a light emitting diode module and an LED heater included in a display apparatus according to an embodiment. FIG. 11 shows an example in which a display apparatus according to an embodiment communicates with an external device.

As shown in FIGS. 6, 7, 8, 9, 10, and 11, the display apparatus 100 includes a user input 110 for receiving a user input from the user, a content receiver 120 for receiving video and/or audio signals from content sources, an image display 130 for displaying images, a sound output 140 for outputting sound, an environment detector 150 for collecting environmental information of the display apparatus 100, an LED module temperature sensor 155 for measuring the temperature of the light emitting diode module 104, a temperature controller 160 to prevent water condensation in the light emitting diode module 104, a communicator 170 communicating with external devices 10 and 20, a data storage 180 for storing various programs and data, and a controller 190 for controlling the operation of the display apparatus 100.

The user input 110 may include an input button 111 for receiving the user input. For example, the user input 110 may include a power button for soft turning on (starting operation) or soft turning off (ending operation) of the display apparatus 100, a sound control button for adjusting the volume of sound output from the display apparatus 100, and a source selection button for selecting a content source.

Each of the input buttons 111 may receive the user input and output electrical signals corresponding to the user input to the controller 190, and it can be implemented by various input means such as a push switch, a touch switch, a dial, a slide switch, and a toggle switch.

The user input 110 also includes a signal receiver 112 that receives a remote control signal of a remote controller. The remote controller receiving the user input may be provided separately from the display apparatus 100, and may receive the user input and transmit a wireless signal corresponding to the user input to the display apparatus 100. The signal receiver 112 may receive a wireless signal corresponding to the user input from the remote controller and output an electrical signal corresponding to the user input to the controller 190.

The content receiver 120 may include a receiver terminal 121 and a tuner 122 that receive content including video signals and/or audio signals from content sources.

The receiving terminal 121 may receive a video signal and an audio signal from content sources through a cable. For example, the receiving terminal 121 includes a Component (YPbPr/RGB) terminal, Composite (composite video blanking and sync, CVBS) terminal, Audio terminal, High Definition Multimedia Interface (HDMI) terminal, a Universal Serial Bus (USB) terminal, etc.

The tuner 122 may receive a broadcast signal from a broadcast reception antenna or a wired cable, and extract a broadcast signal of a channel selected by the user from among the broadcast signals. For example, the tuner 122 passes a broadcast signal having a frequency corresponding to a channel selected by the user among the plurality of broadcast signals received through the broadcast reception antenna or the wired cable, or blocks broadcast signals having different frequencies.

As such, the content receiver 120 may receive video signals and audio signals from content sources through the receiving terminal 121 and/or the tuner 122, and may output the video signal and/or the audio signal received through the reception terminal 121 and/or the tuner 122 to the controller 190.

The image display 130 includes the light emitting diode module 104 for visually displaying an image, and an LED driver 131 for driving the light emitting diode module 104.

The LED driver 131 may receive image data from the controller 190 and drive the light emitting diode module 104 to display the image corresponding to the received image data. For example, the LED driver 131 may output an image signal for displaying an image on the light emitting diode module 104.

As shown in FIG. 7, the LED driver 131 may include a data driver 131a and a scan driver 131b.

The data driver 131a receives red/green/blue image data (hereinafter referred to as "RGB image data") and a data control signal from the controller 190, and outputs the RGB image data to the light emitting diode module 104 according to the data control signal. Specifically, the data driver 131a may receive digital RGB image data, convert the digital RGB image data to an analog RGB image signal, and output the analog RGB image signal to the light emitting diode module 104.

A plurality of outputs provided in the data driver 131a may be connected to a plurality of data lines D1, D2, and D3 of the light emitting diode module 104, respectively, and the data driver 131a may output an RGB image signal to each of the plurality of light emitting diode elements 200 included in the light emitting diode module 104 through the plurality of data lines D1, D2, and D3. For example, the data driver 131a may simultaneously output an RGB image signal to each of the plurality of light emitting diode elements 200 included in one row on the light emitting diode module 104.

The scan driver 131b receives a scan control signal from the controller 190, and activates the plurality of light emitting diode elements 200 included in any one of the plurality of rows according to the scan control signal. For example, the scan driver 131b may output an activation signal to any one of a plurality of scan lines S1 and S2 according to the scan control signal.

The scan driver 131b may select any one of the plurality of scan lines S1 and S2 to provide the RGB image signal to the light emitting diode devices 200 belonging to an appropriate row among the plurality of light emitting diode devices 200 arranged in a matrix according to the scan control signal Also, the data driver 131a may output an RGB image signal through the plurality of data lines D1, D2, and D3, and the RGB image signal output by the data driver 131a may be provided to the light emitting diode elements 200 belonging to a row selected by the scan driver 131b.

As such, the data driver 131a and the scan driver 131b may sequentially provide the RGB image signal to the plurality of light emitting diode elements 200 included in the light emitting diode module 104.

The light emitting diode module 104 may generate an image according to the image data received from the LED driver 131 and display the image.

As shown in FIG. 8, the light emitting diode module 104 may include the plurality of pixels P. Each of the plurality of pixels P includes the red sub-pixel $P_R$, the green sub-pixel $P_G$, and the blue sub-pixel $P_B$.

Each of the plurality of sub-pixels $P_R$, $P_G$, and $P_B$ may include the light emitting diode device 200. For example, the red sub-pixel $P_R$ includes a red light emitting diode element 200r that emits red light, the green sub-pixel $P_G$ includes a green light emitting diode device 200g that emits green light, and the blue sub-pixel $P_B$ may include a blue light emitting diode device 200b that emits blue light. The red light emitting diode device 200r, the green light emitting diode device 200g, and the blue light emitting diode device 200b may integrally constitute one light emitting diode device, or each may constitute a separate light emitting diode device.

The plurality of light emitting diode elements 200 may be arranged in two dimensions on the light emitting diode module 104. For example, the plurality of light emitting diode elements 200 may be arranged in a matrix on the light emitting diode module 104. In other words, the plurality of light emitting diode devices 200 may be arranged in rows and columns.

The plurality of data lines D1, D2, and D3 and the plurality of scan lines S1 and S2 may be provided between the plurality of light emitting diode devices 200. The plurality of scan lines S1 and S2 and the plurality of data lines D1, D2, and D3 may be connected to the LED driver 131.

Each of the red light emitting diode element 200r, the green light emitting diode element 200g, and the blue light emitting diode element 200b of the light emitting diode module 104 may receive RGB image signals from the data driver 131a, respectively.

Each of the red light emitting diode device 200r, the green light emitting diode device 200g, and the blue light emitting diode device 200b may output light having different intensities according to the RGB image signal output from the data driver 131a. In addition, each of the red light emitting diode device 200r, the green light emitting diode device 200g, and the blue light emitting diode device 200b may emit light having different wavelengths (different colors).

The sound output 140 includes a speaker 141 that outputs sound as an audible signal (sound wave).

The speaker 141 may convert an analog sound signal amplified by an amplifier into sound (sound wave). For example, the speaker 141 may include a thin film that vibrates according to an electrical acoustic signal, and sound waves may be generated by vibration of the thin film.

The environment detector 150 includes an ambient temperature sensor 151 for sensing the ambient temperature of the light emitting diode module 104, and an ambient humidity sensor 152 (ambient humidity) for sensing the ambient humidity of the light emitting diode module 104.

The ambient temperature sensor 151 can measure the ambient temperature of the light emitting diode module 104, and can be installed inside the cabinet 101 of the display apparatus 100 or outside the cabinet 101.

The ambient temperature sensor 151 may transmit an electrical signal corresponding to the ambient temperature of the light emitting diode module 104 to the controller 190. For example, the ambient temperature sensor 151 may change the electrical resistance value according to the ambient temperature.

The ambient humidity sensor 152 can measure the ambient humidity of the light emitting diode module 104 and can be installed inside the cabinet 101 of the display apparatus 100 or outside the cabinet 101.

The ambient humidity sensor 152 may transmit an electrical signal corresponding to the ambient humidity of the light emitting diode module 104 to the controller 190. For example, the ambient humidity sensor 152 may change the electrical resistance value according to the ambient humidity or a capacitance may change according to the ambient humidity.

The LED module temperature sensor 155 may measure the temperature of the light emitting diode module 104, and may be installed on the light emitting diode device 200 and/or the module substrate 104c of the light emitting diode module 104.

For example, as shown in FIG. 9a, the LED module temperature sensor 155 may be installed around the p-type pad 260 of the light emitting diode device 200. In addition, the LED module temperature sensor 155 can transmit an electrical signal corresponding to the temperature of the light emitting diode device 200 to the controller 190, and the controller 190 may identify the temperature of the light emitting diode module 104 based on the electrical signal of the LED module temperature sensor 155.

As another example, as shown in FIG. 9b, the LED module temperature sensor 155 may be installed on the module substrate 104c. In addition, the LED module temperature sensor 155 may transmit an electrical signal corresponding to the temperature of the module substrate 104c to the controller 190, and the controller 190 may identify the temperature of the light emitting diode module 104 based on the electrical signal of the LED module temperature sensor 155.

The temperature controller 160 includes a heater 161 for heating the light emitting diode module 104, and a fan 162 to circulate the air around the light emitting diode module 104, and the temperature controller 160 may also control the heater 161 and the fan 162 according to a control signal of the controller 190.

The heater 161 may heat the light emitting diode module 104 and/or the light emitting diode device 200. Condensation of water vapor in the light emitting diode module 104 and/or the light emitting diode element 200 may be prevented because the light emitting diode module 104 and/or the light emitting diode element 200 is heated.

For example, the heater 161 may generate heat by the flow of current. As shown in FIG. 10, the heater 161 may be located in the vicinity of the light emitting diode device 200 on the light emitting diode module 104, and the heater 161 heats the light emitting diode device 200, and accordingly, the temperature of the light emitting diode device 200 may increase.

The fan 162 may circulate air around the light emitting diode module 104 and/or the light emitting diode device 200. Condensation of water vapor in the light emitting diode module 104 and/or the light emitting diode element 200 can be prevented by circulating air around the light emitting diode module 104 and/or the light emitting diode element 200.

The fan 162 flows air from outside the cabinet 101 into the cabinet 101 so that air in the vicinity of the light emitting diode module 104 circulates or air inside the cabinet 101 may be discharged outside the cabinet 101. Accordingly, condensation of water vapor on the light emitting diode module 104 and/or the light emitting diode element 200 is prevented, and water droplets condensed on the light emitting diode module 104 and/or the light emitting diode element 200 may be evaporated by the circulation of air.

As such, the temperature controller 160 may control the temperature of the light emitting diode module 104 and/or the temperature inside the cabinet 101 in response to the control signal of the controller 190 using the heater 161 and/or the fan 162. Furthermore, the temperature controller 160 may transmit a control signal to control an ambient air environment of the cabinet 101 in response to the control signal of the controller 190 to the external devices 10 and 20 through the communicator 170.

The communicator 170 may exchange data with the external devices 10 and 20. For example, as illustrated in FIG. 11, the communicator 170 may exchange data with the air conditioner 10 and/or the dehumidifier 20. The communicator 170 receives a signal including temperature and/or humidity values around the display apparatus 100 from the air conditioner 10 and/or the dehumidifier 20, and transmits a signal including an operation command to the air conditioner 10 and/or the dehumidifier 20.

The communicator 170 may include a wired communication module 171 that exchanges data with the external devices 10 and 20 over a wired line, and a wireless communication module 172 that wirelessly exchanges data with the external devices 10 and 20.

The wired communication module 171 may access a wired communication network and communicate with the air conditioner 10 and/or the dehumidifier 20 through the wired communication network. For example, the wired communication module 171 connects to a wired communication network through Ethernet (Ethernet, IEEE 802.3 technology standard), and receives data from the air conditioner 10 and/or the dehumidifier 20 through the wired communication network.

The wireless communication module 172 may communicate wirelessly with a base station or access point (AP), and may access a wired communication network through the base station or the access point. The wireless communication module 172 may also communicate with the air conditioner 10 and/or the dehumidifier 20 connected to the wired communication network via the base station or the access point. For example, the wireless communication module 172 wirelessly communicates with the access point (AP) using Wi-Fi (WiFi™, IEEE 802.11 technology standard), or communicates with the base station using CDMA, WCDMA, GSM, Long Term Evolution (LTE), WiBro, etc. The wireless communication module 172 may also receive data from the air conditioner 10 and/or the dehumidifier 20 via the base station or the access point.

In addition, the wireless communication module 172 may communicate directly with the air conditioner 10 and/or the dehumidifier 20. For example, the wireless communication module 172 uses the air conditioner 10 and/or Wi-Fi, Bluetooth (Bluetooth™, IEEE 802.15.1 technology standard), ZigBee™ (IEEE 802.15.4 technology standard), and the like to receive data wirelessly from the air conditioner 10 and/or the dehumidifier 20.

As such, the communicator 170 can exchange data with the air conditioner 10 and/or the dehumidifier 20, and output the data received from the air conditioner 10 and/or the dehumidifier 20 to the controller 190.

The data storage 180 may include a storage medium 181 for storing programs and data for controlling the operation of the display apparatus 100. Here, the program includes a plurality of instructions combined to perform a specific function, and the data can be processed by the plurality of instructions included in the program.

The storage medium 181 may store content data in the form of a file. For example, the storage medium 181 may store content data in the form of "*.mpg," "*.avi," "*.asf," or "*.mp4" files, and provides the content data to the controller 190 in response to a readout command of the controller 190.

The storage medium 181 may store an ambient temperature and/or an ambient humidity collected by the environment detector 150 according to the date. For example, the storage medium 181 may store a database (DB) including the ambient temperature and/or the ambient humidity in response to a read command of the controller 190, and provides the database information to the controller 190.

The storage medium 181 may store programs and/or data electrically, magnetically or optically. For example, the storage medium 181 may include a solid state driver (SSD), a hard disc drive (HDD) or an optical disc drive (ODD).

As such, the data storage 180 may store programs and/or data, and may provide the programs and/or the data to the controller 190 in response to the read command of the controller 190.

The controller 190 may include one or two or more memories 191 that store programs and data, and one or two or more processors 192 that process data according to the program. The controller 190 may include hardware such as the processor 192 and the memory 191 and software such as programs and data stored in the memory 191 and/or the data storage 180.

The memory 191 may store programs and data for controlling components included in the display apparatus 100. For example, the memory 191 may store instructions executed by the processor 192.

The memory 191 may temporarily store data provided from a configuration included in the display apparatus 100. For example, the memory 191 can remember the user input passed from the user input 110, video data received through the content receiver 120, an ambient temperature and/or an ambient humidity detected by the environment detector 150, the LED module temperature sensor 155 sensed light-emitting diode temperature, communication data received through the communicator 170, and data stored in the data storage 180.

The memory 191 includes a non-volatile memory, such as read only memory (ROM) and flash memory for storing data for a long period of time, and a volatile memory such as static random access memory (S-RAM) and dynamic random access memory (D-RAM) for temporarily storing data.

The processor 192 may process data stored in the memory 191 according to a program (series of programs) stored in the memory 191. For example, the processor 192 may process the user input, image data, an ambient temperature and/or an ambient humidity, a temperature of the light emitting diode module 104, communication data, storage data, and the like according to the program stored in the memory 191. Also, the processor 192 may generate a control signal for controlling the image display 130, the temperature controller 160, the communicator 170, and/or the data storage 180 based on the result of processing the data.

The processor 192 may include an operation circuit that performs logical operations and arithmetic operations, and a memory circuit that stores the calculated data.

As such, the controller 190 may process data obtained from components included in the display apparatus 100 and establish the components included in the display apparatus 100.

The controller 190 may control the operation of the display apparatus 100 according to the user input through the user input 110. For example, the controller 190 may supply power to the image display 130 and transmit image data to the image display 130 in response to an input for initiating (turning on) the user. In addition, the controller 190 may stop transmitting the image data to the image display 130 in response to an input for terminating (turning off) the user, and cut off the power supply to the image display 130.

The controller 190 may process image data (image frame data, television broadcast signals, streaming data, etc.) received through the content receiver 120 or stored in the data storage 180. For example, the controller 190 may obtain compressed/encoded image data from the content receiver 120 and/or the data storage 180, and decode the compressed/encoded image data into an image frame. In addition, the controller 190 may provide the processed image frame to the image display 130.

The controller 190 calculates a dew point temperature based on the ambient temperature and/or the ambient humidity detected by the environment detector 150, or calculates the dew point temperature based on the ambient temperature and/or the ambient humidity received from the air conditioner 10 and/or the dehumidifier 20 through the communicator 170, or obtains the dew point temperature stored in the data storage 180 from the data storage 180.

The controller 190 may control the communicator 170 to drive the heater 161 and/or the fan 162 or to transmit a signal requesting operation to the air conditioner 10 and/or the dehumidifier 20 according to the dew point temperature and the temperature of the light emitting diode module 104 detected by the LED module temperature sensor 155.

The processor 192 and the memory 191 may be implemented as a plurality of separate semiconductor devices, or may be implemented as a single semiconductor device.

As described above, the display apparatus 100 acquires the ambient temperature, the ambient humidity, and the temperature of the light emitting diode module 104, and controls the temperature controller 160 according to the ambient temperature, the ambient humidity, and the light emitting diode module 104.

Hereinafter, the operation of the display apparatus 100 will be described in more detail.

Figure 12:
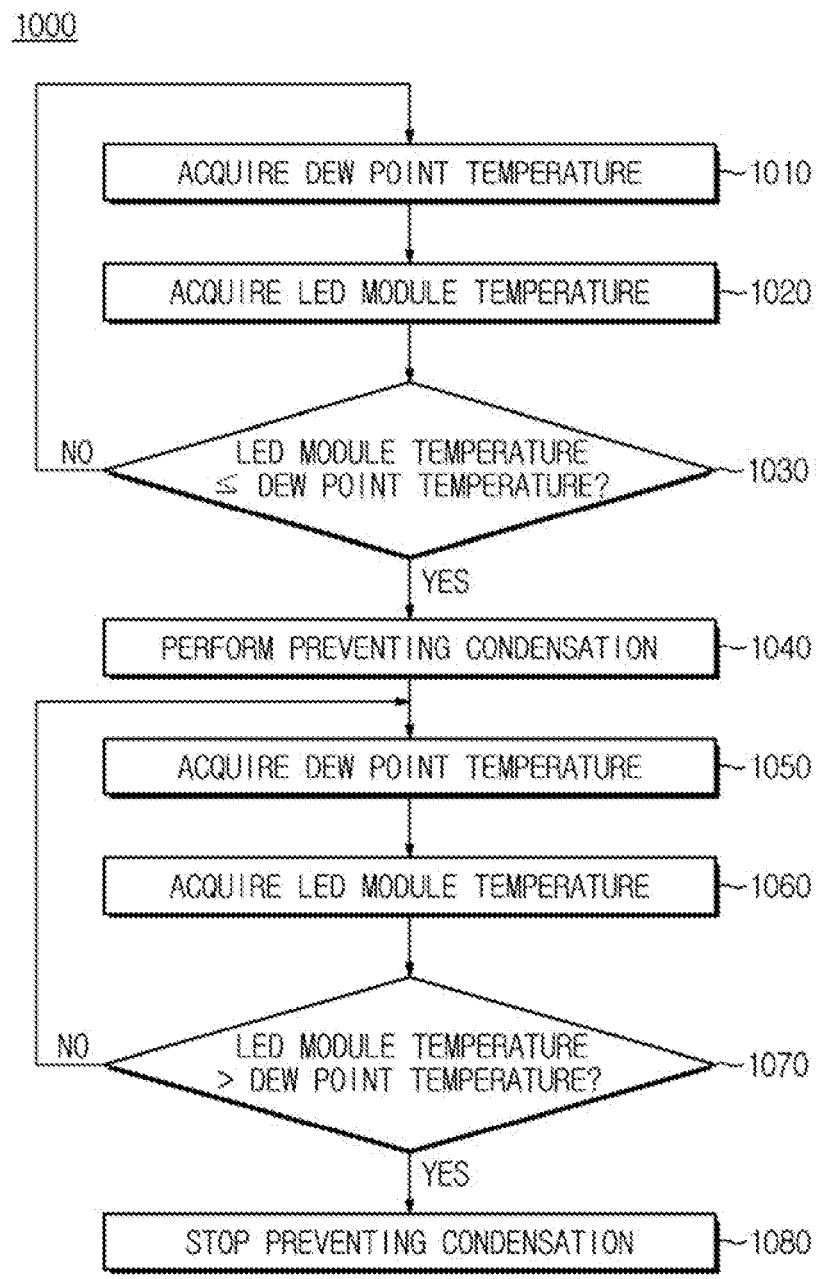
FIG. 12 shows an example of an operation of a display apparatus according to an embodiment to prevent condensation of water vapor.
Figure 13:
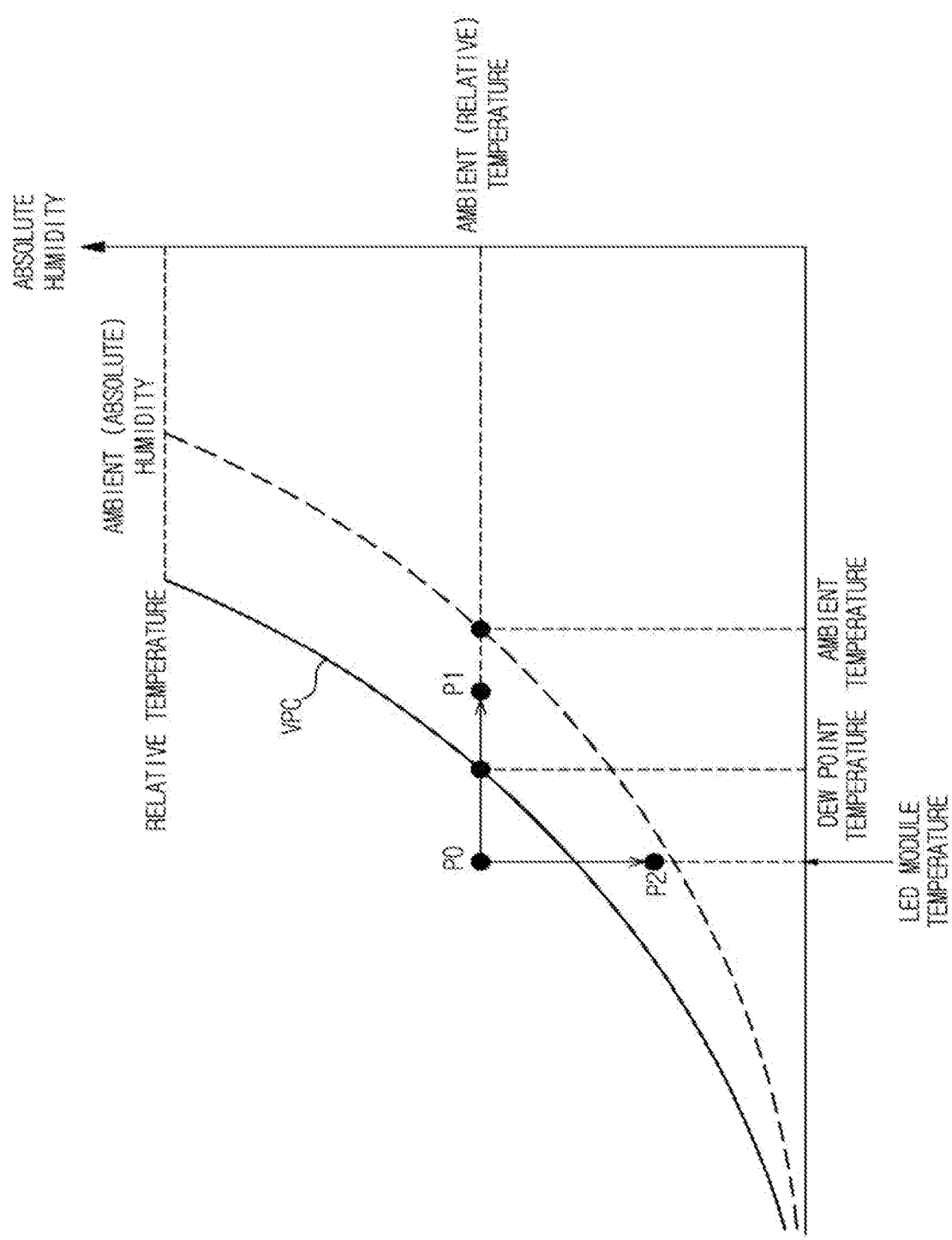
FIG. 13 shows changes in temperature and humidity by the operation shown in FIG. 12.

FIG. 12 shows an example of an operation of a display apparatus according to an embodiment to prevent condensation of water vapor. FIG. 13 shows changes in temperature and humidity by the operation shown in FIG. 12.

As shown in FIGS. 12 and 13, condensation prevention operation 1000 of the display apparatus 100 is described.

The condensation prevention operation 1000 may be automatically executed every predetermined period. For example, the display apparatus 100 may perform the condensation prevention operation 1000 every 10 ms (millisecond) after being connected to an external power source.

In addition, the condensation prevention operation 1000 may be executed manually by the user input by the user. For example, the display apparatus 100 may perform the condensation prevention operation 1000 in response to the user input for preventing condensation through the user input 110.

The display apparatus 100 acquires the dew point temperature of ambient air (1010).

The display apparatus 100 can obtain the dew point temperature of the ambient air in various ways.

For example, the display apparatus 100 may directly measure the ambient temperature and the ambient humidity using the environment detector 150, and calculate the dew point temperature from the measured ambient temperature and ambient humidity.

The controller 190 can control the environment detector 150 to detect the ambient temperature and the ambient humidity. The ambient temperature sensor 151 of the environment detector 150 transmits an electrical signal corresponding to the ambient temperature of the display apparatus 100 to the controller 190, and the controller 190 can identify the ambient temperature from the electrical signal of the ambient temperature sensor 151. In addition, the ambient humidity sensor 152 of the environment detector 150 transmits an electrical signal corresponding to the ambient humidity of the display apparatus 100 to the controller 190, and the controller 190 can identify the ambient humidity from the electrical signal of the ambient humidity sensor 152.

Thereafter, the controller 190 may obtain the dew point temperature of the ambient air from the ambient temperature and the ambient (relative) humidity.

The relationship between air temperature and humidity is known to be as shown in FIG. 13. It is known that when the temperature decreases at a certain humidity, water vapor condenses, and as the humidity increases, the temperature at which water vapor condenses increases.

As shown in FIG. 13, saturated water vapor content curves (saturated vapor pressure curve) (VPC) are introduced to indicate the temperature at which water vapor condenses for various humidity. It is known that water vapor condenses when a point P0 determined by the temperature and the humidity of the air is located above the saturated water vapor pressure curve (VPC) based on the graph of FIG. 13.

It is known that the dew point temperature of the air depends on the absolute humidity of the air (the amount of water vapor contained in the air), or on the temperature of the air and the relative humidity.

The controller 190 may calculate the dew point temperature of the ambient air from the ambient temperature and the ambient (relative) humidity. Specifically, the controller 190 may calculate the dew point temperature of the ambient air from the ambient temperature and the ambient humidity using [Equation 1].

$$T_{DEW} = \frac{\left(243.04 \times \log\frac{H_{air}}{100}\right) + \left(\frac{17.625 \times T_{air}}{243.04 + T_{air}}\right)}{\left(17.625 \times \log\frac{H_{air}}{100}\right) - \left(\frac{17.625 \times T_{air}}{243.04 + T_{air}}\right)}$$ [Equation 1]

Here, $T_{DEW}$ represents the dew point temperature of the ambient air of the light emitting diode module 104, $T_{air}$ represents the temperature of the ambient air of the light emitting diode module 104, and $H_{air}$ may indicate the (relative) humidity of the ambient air of the light emitting diode module 104.

As another example, the display apparatus 100 receives information about the ambient temperature and the ambient humidity from an external device, and calculates the dew point temperature from the received ambient temperature and ambient humidity.

The controller 190 of the display apparatus 100 may request information about the ambient temperature and the ambient humidity from the air conditioner 10 and/or the dehumidifier 20 through the communicator 170. In response to a request from the display apparatus 100, the air conditioner 10 and/or the dehumidifier 20 may transmit information about the ambient temperature and the ambient humidity to the display apparatus 100. The controller 190 may obtain the ambient temperature and the ambient humidity from the air conditioner 10 and/or the dehumidifier 20 through the communicator 170.

Thereafter, the controller 190 may calculate the dew point temperature of the ambient air from the ambient temperature and the ambient humidity using [Equation 1] described above.

As another example, the display apparatus 100 may receive information regarding the dew point temperature from the external device.

The controller 190 of the display apparatus 100 may request information regarding the dew point temperature of an area where the display apparatus 100 is located from an external server that can provide weather information. In response to the request of the display apparatus 100, the external server may transmit information regarding the dew point temperature of a corresponding region to the display apparatus 100. The controller 190 can obtain the dew point temperature of the ambient air from the external server through the communicator 170.

The controller 190 calculates the dew point temperature from the ambient temperature and the ambient humidity measured through the environment detector 150, and the controller 190 calculates the dew point temperature from the ambient temperature and the humidity received through the communicator 170 when the environment detector 150 is omitted or a malfunction of the environment detector 150 is detected.

The controller 190 calculates the dew point temperature from the ambient temperature and the ambient humidity received through the communicator 170, and the controller 190 can calculate the dew point temperature from the ambient temperature and the humidity measured through the environment detector 150 when the controller 190 cannot communicate with the external devices 10 and 20 through the communicator 170.

Also, the controller 190 calculates the dew point temperature from the ambient temperature and the humidity received through the communicator 170 according to the user input, or calculates the dew point temperature from the measured ambient temperature and ambient humidity through the environment detector 150.

As another example, the display apparatus 100 may estimate the ambient temperature and the ambient humidity from the database stored in the data storage 180, and calculate the dew point temperature of the ambient air based on the estimated ambient temperature and the ambient humidity.

The controller 190 of the display apparatus 100 may create a database related to the dew point temperature and store the database in the data storage 180. The controller 190 may create a database including the ambient temperature, the ambient humidity, and the date/time when the temperature/humidity is measured (acquired), and store the database in the data storage 180.

The controller 190 may acquire the ambient temperature and the ambient humidity of the current date and time from the database. The controller 190 may identify the ambient temperature and the ambient humidity at the same date and time as one year ago from the database as the ambient temperature and the ambient humidity at the current date and time. In addition, the controller 190 may identify the average values of the ambient temperature and the ambient humidity for the past 10 days as the ambient temperature and the ambient humidity of the current date and time.

As another example, the display apparatus 100 may estimate the dew point temperature from a database stored in the data storage 180.

The controller 190 of the display apparatus 100 can create a database for the dew point temperature and store the database in the data storage 180. The controller 190 may generate a database including the dew point temperature and the date and time at which the dew point temperature is calculated (acquired), and store the database in the data storage 180.

The controller 190 can obtain the dew point temperature of the current date and time from the database. The controller 190 may identify the dew point temperature of the same date and time as one year ago from the database as the dew point temperature of the current date and time. In addition, the controller 190 may identify the average value of the dew point temperature during the past 10 days as the dew point temperature of the current date and time.

The method for obtaining the dew point temperature of the ambient air is not limited to the method described above, and the controller 190 can obtain the dew point temperature of the ambient air in various ways not described above.

The display apparatus 100 obtains the temperature of the light emitting diode module 104 (1020).

The controller 190 of the display apparatus 100 may measure the temperature of the light emitting diode module 104 using the LED module temperature sensor 155.

The controller 190 may control the LED module temperature sensor 155 to sense the temperature of the light emitting diode module 104. The LED module temperature sensor 155 transmits an electrical signal corresponding to the temperature of the light emitting diode module 104 to the controller 190, and the controller 190 may identify the temperature of the light emitting diode module 104 from the electrical signal of the LED module temperature sensor 155.

The display apparatus 100 determines whether the temperature of the light emitting diode module 104 is less than or equal to the dew point temperature of the ambient air (1030).

The controller 190 compares the temperature of the light emitting diode module 104 obtained in operation 1020 and the dew point temperature of the ambient air obtained in operation 1010, and determines whether the temperature of the light emitting diode module 104 is less than or equal to the dew point temperature of the ambient air.

If the temperature of the light emitting diode module 104 is not below the dew point temperature of the ambient air (NO in 1030), the display apparatus 100 may determine that condensation of water vapor does not occur in the current light emitting diode module 104.

Therefore, the display apparatus 100 may repeat obtaining the dew point temperature of the ambient air, obtaining the temperature of the light emitting diode module 104, and comparing between the temperature of the light emitting diode module 104 and the dew point temperature of the ambient air.

If the temperature of the light emitting diode module 104 is less than or equal to the dew point temperature of the ambient air (example of 1030), the display apparatus 100 performs an operation to prevent condensation of water vapor (hereinafter referred to as 'condensation prevention operation') (1040).

Water vapor may penetrate the light emitting diode module 104 according to an ambient environment. For example, when the display apparatus 100 is placed in a high-humidity environment, AMBIENT water vapor of the display apparatus 100 may pass through the epoxy resin of the light emitting diode module 104 to reach the light emitting diode device 200.

If the temperature of the light emitting diode module 104 is less than or equal to the dew point temperature of the ambient air, water vapor that has penetrated the light emitting diode module 104 may condense. Ionization of the wires 104a and 104b may occur due to moisture condensed in water vapor, and a short circuit of the light emitting diode device 200 may occur.

As described above, when the point P0 determined by the temperature and the humidity of the air based on the graph of FIG. 13 is located above the saturated water vapor pressure curve (VPC), water vapor condenses.

When the point P0 determined by the temperature of the light emitting diode module 104 and the humidity of the ambient air is located above the saturated water vapor pressure curve (VPC), water vapor that has penetrated the light emitting diode module 104 may condense. In other words, when the temperature of the light emitting diode module 104 is lower than the dew point temperature due to the temperature/humidity of the ambient air, water vapor that has penetrated the light emitting diode module 104 may condense.

The controller 190 of the display apparatus 100 can prevent water vapor from condensing in the light emitting diode module 104 in various ways.

For example, the display apparatus 100 may adjust the temperature and/or the humidity inside the display apparatus 100. The controller 190 may control the temperature controller 160 to heat the light emitting diode module 104 or circulate air around the light emitting diode module 104.

The controller 190 may transmit a control signal to heat the light emitting diode module 104 to the temperature controller 160, and control the heater 161 to heat the light emitting diode module 104 in response to the control signal of the controller 190. The temperature controller 160 supplies a current to the heater 161, and the heater 161 may generate heat in response to the supply of current.

The temperature of the light emitting diode module 104 may rise due to the heat generated by the heater 161, and the temperature of the light emitting diode module 104 may increase to a temperature higher than the dew point temperature. For example, as illustrated in FIG. 13, the temperature/humidity of the light emitting diode module 104 may be moved from the initial point P0 to a first point P1 by the heating of the heater 161.

As a result, condensation of water vapor that has penetrated the light emitting diode module 104 can be prevented.

In addition, the controller 190 may transmit a control signal to circulate the air inside the display apparatus 100 to the temperature controller 160, and the temperature controller 160 may control the fan 162 to circulate the air inside the display apparatus 100 in response to the control signal of the controller 190. The temperature controller 160 supplies a current to the fan 162, and in response to the supply of current, the fan 162 can circulate air inside the cabinet 101. The fan 162 circulates air around the light emitting diode module 104 so that water vapor that has penetrated the light emitting diode module 104 can be evaporated.

As a result, penetration into the light emitting diode module 104 can be prevented and condensation of water vapor penetrating the light emitting diode module 104 can be prevented.

As another example, the display apparatus 100 may adjust the ambient temperature and/or the ambient humidity of the display apparatus 100. The controller 190 may transmit a control signal to the temperature controller 160 to send a request to adjust the temperature and/or the humidity to the air conditioner 10 and/or the dehumidifier 20. The temperature controller 160 may transmit a control signal to adjust the ambient temperature and/or the ambient humidity of the display apparatus 100 to the air conditioner 10 and/or the dehumidifier 20 through the communicator 170 in response to the control signal of the controller 190.

The temperature controller 160 may transmit a message requesting an operation (dehumidification operation) to lower the humidity of the ambient air of the display apparatus 100 to the air conditioner 10 and/or the dehumidifier 20 through the communicator 170.

The humidity of the AMBIENT air may be lowered by the dehumidifying operation of the air conditioner 10 and/or the dehumidifier 20, and the dew point temperature may also drop together with the humidity of the AMBIENT air. For example, as shown in FIG. 13, by the dehumidifying operation of the air conditioner 10 and/or the dehumidifier 20, the temperature/humidity of the light emitting diode module 104 may move from the initial point P0 to a second point P2.

As a result, condensation of water vapor that has penetrated the light emitting diode module 104 can be prevented.

In addition, the temperature controller 160 may transmit a message requesting an operation (cooling operation) of lowering the temperature of the ambient air of the display apparatus 100 to the air conditioner 10 and/or the dehumidifier 20 through the communicator 170. As a result, condensation of water vapor that has penetrated the light emitting diode module 104 can be prevented. In addition, the temperature controller 160 may transmit a message requesting an operation (cooling operation) of lowering the temperature of the ambient air of the display apparatus 100 to the air conditioner 10 and/or the dehumidifier 20 through the communicator 170. The temperature of the ambient air may be lowered by the cooling operation of the air conditioner 10 and/or the dehumidifier 20, and when the ambient temperature is lower than the dew point temperature, water vapor condensed outside the display apparatus 100 and the humidity inside the display apparatus 100 may be lowered.

As a result, condensation of water vapor penetrating the light emitting diode module 104 may be prevented.

As such, the display apparatus 100 can prevent water vapor from condensing in the light emitting diode module 104 in various directions.

During the operation to prevent condensation of water vapor, the display apparatus 100 acquires the dew point temperature of the ambient air (1050).

Operation 1050 may be the same as operation 1010.

During the operation to prevent condensation of water vapor, the display apparatus 100 acquires the temperature of the light emitting diode module 104 (1060).

Operation 1060 may be the same as operation 1020.

During the operation to prevent condensation of water vapor, the display apparatus 100 determines whether the temperature of the light emitting diode module 104 exceeds the dew point temperature of the ambient air (1070).

The controller 190 compares the temperature of the light emitting diode module 104 obtained in operation 1060 and the dew point temperature of the ambient air obtained in operation 1050, and determines whether the temperature of the light emitting diode module 104 is less than or equal to the dew point temperature of the ambient air.

If the temperature of the light emitting diode module 104 does not exceed the dew point temperature of the ambient air (NO in 1070), the display apparatus 100 still determines that condensation of water vapor occurs in the light emitting diode module 104.

In a state of continuing the water vapor condensation prevention operation, the display apparatus 100 repeats acquiring the dew point temperature of the ambient air, acquiring the temperature of the light emitting diode module 104, and comparing between the temperature of the light emitting diode module 104 and the dew point temperature of the ambient air.

When the temperature of the light emitting diode module 104 exceeds the dew point temperature of the ambient air (YES in 1070), the display apparatus 100 stops the condensation prevention operation (1080).

When the temperature of the light emitting diode module 104 exceeds the dew point temperature of the ambient air, the display apparatus 100 may determine that condensation of water vapor does not occur in the current light emitting diode module 104. Therefore, the display apparatus 100 may stop the condensation prevention operation for preventing condensation of water vapor.

As described above, the display apparatus 100 adjusts the temperature of the light emitting diode module 104 and/or the humidity around the light emitting diode module 104 based on the dew point temperature of the ambient air and the temperature of the light emitting diode module 104. Accordingly, water vapor is prevented from penetrating the light emitting diode module 104, and condensation of the water vapor can be prevented.

The above-described condensation prevention operation 1000 may be performed while external power is connected to the display apparatus 100. In other words, the above condensation prevention operation 1000 may be continuously performed while an external power source is connected to the display apparatus 100.

When the user input for initiating (turn-on) the operation of the display apparatus 100 is input from the user, the display apparatus 100 may perform an additional operation to respond to the user input.

Hereinafter, an operation of preventing condensation of water vapor of the display device 100 will be described after a user input for starting (turn-on) of the display device 100 is input.

Figure 14:
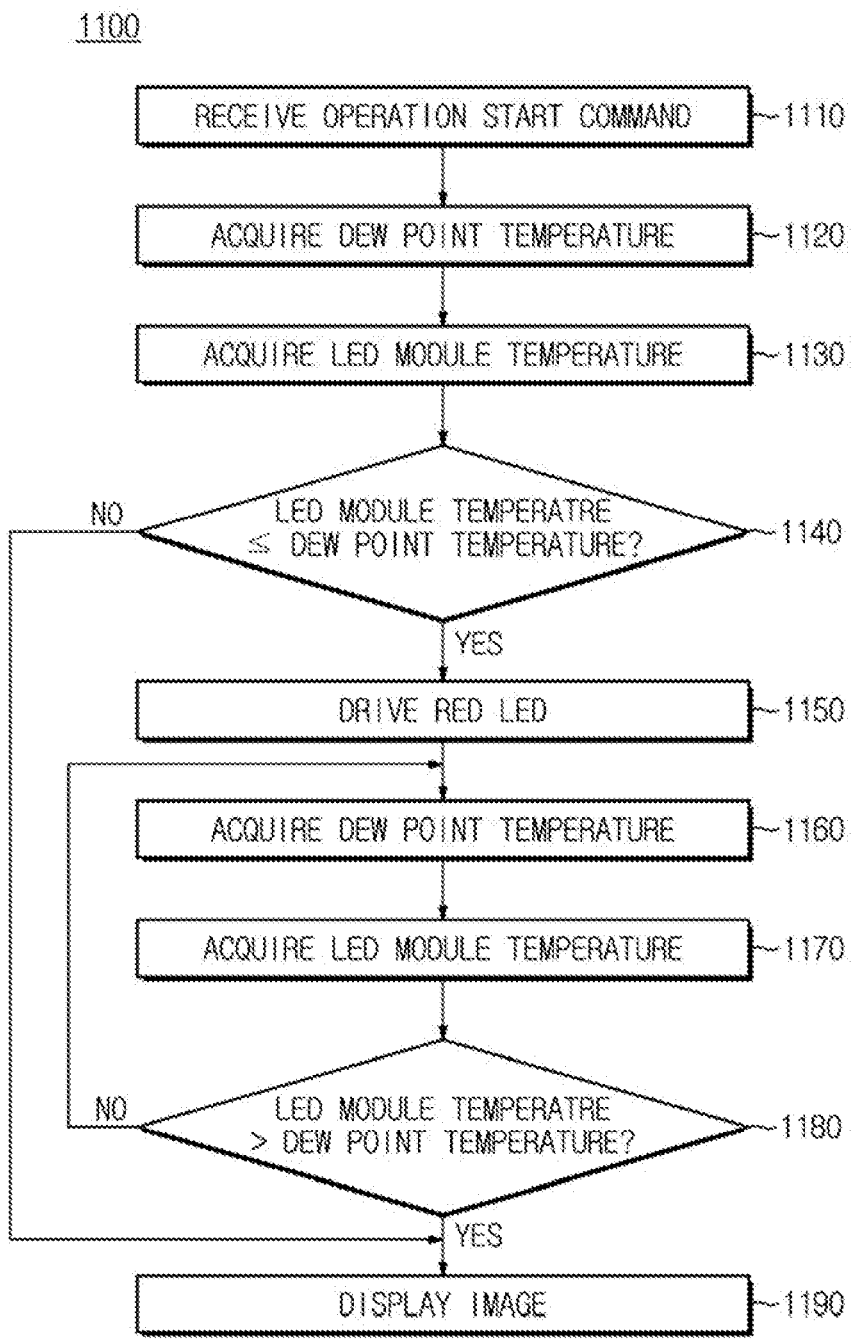
FIG. 14 shows another example of an operation of a display apparatus according to an embodiment to prevent water condensation.

FIG. 14 shows another example of an operation of a display apparatus according to an embodiment to prevent water condensation.

As shown in FIG. 14, condensation prevention operation 1100 of the display apparatus 100 is described.

The condensation prevention operation 1100 may be performed after the user input for initiating the operation of the display apparatus 100. Accordingly, while the condensation prevention operation 1100 is being performed, the condensation prevention operation 1000 illustrated in FIG. 12 may be performed at the same time.

The anti-condensation operation 1100 is executed in response to the user input for initiating (turn-on) the operation of the display apparatus 100, or after predetermined intervals after the user input for initiating (turn-on) the operation of the display apparatus 100 is input.

The display apparatus 100 receives the user input for starting the operation (turn-on) (1110).

The user may input the user input for initiating the operation (turn-on) of the display apparatus 100 through the user input 110 and/or the remote controller of the display apparatus 100. For example, the user may input the user input for initiating the operation in the display apparatus 100 by pressing the power button of the user input 110.

Initiating the operation is also referred to as 'soft turn-on' as the display apparatus 100 starts the operation while the display apparatus 100 is connected to external AC power, and 'soft turn-on' is distinguished from 'hard turn-on,' which connects power to the display apparatus 100.

In the 'hard turn-on' state, the controller 190 may perform a minimum operation including the water vapor condensation prevention operation 1000 described above. For example, the controller 190 operates in the standby mode, and only a part of the controller 190 may be activated or operated in synchronization with a low frequency clock.

In the standby mode, the display apparatus 100 may be in a power saving state. The power saving state may be at least one of switch off state with the external AC power connected to the external AC power or a state where power is supplied only to a minimum circuit component (not shown) that receives and processes the signal from the remote controller through the signal receiver 112.

By the user input for starting the operation, the display apparatus 100 may be switched from the 'hard turn-on' state to the 'soft turn-on' state. In the 'soft turn-on' state, the controller 190 is switched to a normal mode to provide all functions of the display apparatus 100, and may operate in synchronization with a high frequency clock.

In an active mode, the display apparatus 100 may be in a normal power supply state. The normal power supply state may be a state in which normal power is supplied by the user's power on command.

After the user input for starting the operation (turn-on) is input, the display apparatus 100 obtains the dew point temperature of the ambient air (1120). The controller 190 of the display apparatus 100 can calculate the dew point temperature based on the ambient temperature and the ambient humidity measured by the environment detector 150 or received from the air conditioner 10 and/or the dehumidifier 20 or stored in the data storage 180. In addition, the controller 190 can estimate the current dew point temperature based on the data regarding the dew point temperature.

Operation 1120 may be the same as operation 1010 illustrated in FIG. 12.

The display apparatus 100 obtains the temperature of the light emitting diode module 104 (1130). The controller 190 of the display apparatus 100 can measure the temperature of the light emitting diode module 104 using the LED module temperature sensor 155.

Operation 1130 may be the same as operation 1020 illustrated in FIG. 12.

The display apparatus 100 determines whether the temperature of the light emitting diode module 104 is equal to or lower than the dew point temperature of the ambient air (1140). The controller 190 compares the temperature of the light emitting diode module 104 obtained in operation 1130 and the dew point temperature of the ambient air obtained in operation 1120, and determines whether the temperature of the light emitting diode module 104 is equal to or lower than the dew point temperature of the ambient air.

If the temperature of the light emitting diode module 104 is not below the dew point temperature of the ambient air (NO in 1140), the display apparatus 100 drives the light emitting diode device 200 to display an image (1190).

If the temperature of the light emitting diode module 104 exceeds the dew point temperature of the ambient air, the display apparatus 100 may determine that condensation of water vapor does not occur in the current light emitting diode module 104. Therefore, the display apparatus 100 can display an image.

If the temperature of the light emitting diode module 104 is less than or equal to the dew point temperature of the ambient air (YES in 1140), the display apparatus 100 drives the red light emitting diode element 200r (1150).

If the temperature of the light emitting diode module 104 is less than the dew point temperature of the ambient air, water vapor that has penetrated the light emitting diode module 104 may condense.

The controller 190 of the display apparatus 100 may control the LED driver 131 to supply a driving current to the red light emitting diode device 200r to prevent water vapor from condensing on the light emitting diode module 104. The LED driver 131 may supply a driving current to the red light emitting diode device 200r.

The red light emitting diode device 200r may emit red light and heat by supplying a driving current. In addition, the temperature of the light emitting diode module 104 may increase by driving the red light emitting diode device 200r, and the temperature of the light emitting diode module 104 may increase to a temperature higher than the dew point temperature.

In order to heat the light emitting diode module 104, the controller 190 is not limited to supplying a driving current to the red light emitting diode device 200r, and the controller 190 may supply a driving current to the green light emitting diode device 200g and/or the blue light emitting diode device 200b.

While driving the red light emitting diode device 200r, the display apparatus 100 acquires the dew point temperature of the ambient air (1160).

Operation 1160 may be the same as operation 1120.

While driving the red light emitting diode device 200r, the display apparatus 100 acquires the temperature of the light emitting diode module 104 (1170).

Operation 1170 may be the same as operation 1130.

While driving the red light emitting diode device 200r, the display apparatus 100 determines whether the temperature of the light emitting diode module 104 is greater than or equal to the dew point temperature of the ambient air (1180).

The controller 190 compares the temperature of the light emitting diode module 104 obtained in operation 1170 and the dew point temperature of the ambient air obtained in operation 1160, and determines whether the temperature of the light emitting diode module 104 is less than or equal to the dew point temperature of the ambient air.

If the temperature of the light emitting diode module 104 is not higher than the dew point temperature of the ambient air (NO of 1180), the display apparatus 100 may still determine that condensation of water vapor occurs in the light emitting diode module 104.

While driving the red light emitting diode element 200r, the display apparatus 100 repeats obtaining the dew point temperature of the ambient air, obtaining the temperature of the light emitting diode module 104, and comparing between the temperature of the light emitting diode module 104 and the dew point temperature of the ambient air.

If the temperature of the light emitting diode module 104 is greater than or equal to the dew point temperature of the ambient air (YES in 1180), the display apparatus 100 drives the light emitting diode device 200 to display an image (1190).

If the temperature of the light emitting diode module 104 is greater than or equal to the dew point temperature of the ambient air, the display apparatus 100 may determine that condensation of water vapor does not occur in the current light emitting diode module 104. In particular, even if the temperature of the light emitting diode module 104 is equal to the dew point temperature of the ambient air, since it is expected to be further heated by the driving of the light emitting diode device 200, the display apparatus 100 may determine that condensation of water vapor does not occur in the current light emitting diode module 104.

The controller 190 may process the image data provided from the content receiver 120 and control the image display 130 to display an image corresponding to the image data. Specifically, the controller 190 may control the LED driver 131 to supply a driving current to the red/green/blue light emitting diode elements 200r, 200g, and 200b according to the image data.

As described above, the display apparatus 100 may drive the red light emitting diode device 200r based on the dew point temperature of the ambient air and the temperature of the light emitting diode module 104. Accordingly, the light emitting diode module 104 is heated, and condensation of water vapor penetrating the light emitting diode module 104 can be prevented.

Meanwhile, the disclosed embodiments may be implemented in the form of a recording medium that stores instructions executable by a computer. The instructions may be stored in the form of a program code, and when executed by a processor, may generate program modules to perform operations of the disclosed embodiments. The recording medium may be embodied as a computer-readable recording medium.

The computer-readable recording medium includes all kinds of recording media storing instructions that can be read by a computer. For example, there may be read only memory (ROM), random access memory (RAM), a magnetic tape, a magnetic disk, flash memory, and an optical data storage device.

As described above, the disclosed embodiments have been described with reference to the accompanying drawings. Those of ordinary skill in the art to which the posted embodiments belong will understand that they may be practiced in different forms from the disclosed embodiments without changing the technical spirit or essential features of the posted embodiments. The disclosed embodiments are illustrative and should not be construed as limiting.

The invention claimed is:

1. A display apparatus comprising:
    a cabinet;
    a light emitting diode module provided in the cabinet;
    a communicator configured to receive an ambient atmospheric measurement value of the cabinet from an external device;
    a temperature sensor provided in the light emitting diode module;
    a temperature controller configured to control a temperature of the light emitting diode module; and
    a controller configured to:
        control the temperature controller so that the temperature of the light emitting diode module is greater than a dew point temperature when the measured temperature based on an output of the temperature sensor in a standby mode being a power saving state is equal to or lower than the dew point temperature based on the ambient atmospheric measurement value, and
        drive the light emitting diode module so that the temperature of the light emitting diode module is greater than the dew point temperature when the measured temperature is below the dew point temperature based on the ambient atmospheric measurement value when switching to an active mode being a normal power supply state.

2. The display apparatus of claim 1, wherein the controller transmits a control signal through the communicator so that the external device controls an ambient atmospheric environment based on the control signal when the measured temperature is less than the dew point temperature during the standby mode, and transmits the control signal to stop the operation of the external device through the communicator when the measured temperature is greater than the dew point temperature.

3. The display apparatus of claim 1, wherein the controller drives at least one red light emitting diode element included in the light emitting diode module when switching to the active mode, and controls the light emitting diode module to display an image when the measured temperature is equal to or greater than the dew point temperature.

4. The display apparatus of claim 1, wherein the light emitting diode module comprises a plurality of light emitting diode elements, and a printed circuit board on which the plurality of light emitting diode elements are mounted, and
    the temperature controller comprises a heater provided on the printed circuit board, and drives the heater when the measured temperature is above the dew point temperature during the standby mode.

5. The display apparatus of claim 1, wherein the temperature controller comprises a fan circulating air inside the cabinet, and drives the fan when the measured temperature is above the dew point temperature during the standby mode.

6. The display apparatus of claim 1, wherein an ambient atmospheric environment includes an ambient temperature and an ambient humidity of the cabinet, and
    the external device comprises a sensor module configured to sense the ambient temperature and the ambient humidity of the cabinet, and
    the controller calculates the dew point temperature based on an output of the sensor module received through the communicator.

7. The display apparatus of claim 1, wherein an ambient atmospheric environment includes an ambient temperature and an ambient humidity of the cabinet, and
    the display apparatus further comprises a sensor module configured to detect the ambient temperature and the ambient humidity of the cabinet, and
    the controller calculates the dew point temperature based on an output of the sensor module.

8. The display apparatus of claim 1, wherein the display apparatus further comprises a storage configured to store data including the dew point temperature and the data and time at which the dew point temperature was calculated, and the controller acquires the dew point temperature based on the data stored in the storage.

9. A controlling method of a display apparatus including a light emitting diode module, a temperature sensor provided in the light emitting diode module, and a temperature controller controlling a temperature of the light emitting diode module, the method comprising:
- calculating a dew point temperature;
- controlling the temperature controller so that the temperature of the light emitting diode module is greater than the dew point temperature when the measured temperature based on an output of the temperature sensor in a standby mode being a power saving state is equal to or lower than the dew point temperature based on an ambient atmospheric measurement value, and
- driving the light emitting diode module so that the temperature of the light emitting diode module is greater than the dew point temperature when the measured temperature is below the dew point temperature based on the ambient atmospheric measurement value when switching to an active mode being a normal power supply state.

10. The method of claim 9 further comprising:
- transmitting a control signal through the communicator so that an external device controls an ambient atmospheric environment based on the control signal when the measured temperature is less than the dew point temperature during the standby mode, and
- transmitting the control signal to stop the operation of the external device through the communicator when the measured temperature is greater than the dew point temperature.

11. The method of claim 9 further comprising:
- driving at least one red light emitting diode element included in the light emitting diode module when switching to the active mode, and
- controlling the light emitting diode module to display an image when the measured temperature is equal to or greater than the dew point temperature.

12. The method of claim 9 further comprising:
- driving a fan provided on a printed circuit board of the light emitting diode module when the measured temperature is above the dew point temperature during the standby mode.

13. The method of claim 9 further comprising:
- driving a fan circulating air inside a cabinet when the measured temperature is above the dew point temperature during the standby mode.

14. The method of claim 9, wherein an ambient atmospheric environment comprises an ambient temperature and an ambient humidity of the display apparatus, and
- wherein circulating the dew point temperature comprises calculating the dew point temperature based on the received ambient temperature and the ambient humidity of the display apparatus.

15. The method of claim 9, wherein an ambient atmospheric environment comprises an ambient temperature and an ambient humidity of the display apparatus, and
- wherein calculating the dew point temperature comprises calculating the dew point temperature based on an output of a sensor module calculating the ambient temperature and the ambient humidity of the display apparatus.

* * * * *